(12) United States Patent
Ulcej et al.

(10) Patent No.: US 8,777,605 B2
(45) Date of Patent: Jul. 15, 2014

(54) DECKLE TECHNOLOGY

(75) Inventors: John A. Ulcej, Colfax, WI (US); Jordan L. Sedivy, Chippewa Falls, WI (US)

(73) Assignee: Nordson Extrusion Dies Industries, LLC, Chippewa Falls, WI (US)

( * ) Notice: Subject to any disclaimer, the term of this patent is extended or adjusted under 35 U.S.C. 154(b) by 147 days.

(21) Appl. No.: 13/080,081

(22) Filed: Apr. 5, 2011

(65) Prior Publication Data

US 2011/0206795 A1 Aug. 25, 2011

(51) Int. Cl.
*B29C 47/16* (2006.01)

(52) U.S. Cl.
USPC .......................................... 425/466; 425/381

(58) Field of Classification Search
USPC ................................. 425/466, 381
See application file for complete search history.

(56) References Cited

U.S. PATENT DOCUMENTS

| | | | |
|---|---|---|---|
| 2,488,830 A | 11/1949 | Redington | |
| 2,671,417 A | 3/1954 | Jacobsen | |
| 3,018,515 A | 1/1962 | Sneddon | |
| 3,323,169 A | 6/1967 | Vitellaro | |
| 3,502,757 A | 3/1970 | Spencer | |
| 3,611,491 A | 10/1971 | Rector | |
| 3,797,987 A | 3/1974 | Marion | |
| 3,804,569 A | 4/1974 | Walker | |
| 3,840,318 A | 10/1974 | Solop | |
| 3,870,454 A * | 3/1975 | Penrod | 425/466 |
| 4,057,385 A | 11/1977 | Yazaki et al. | |
| 4,248,579 A | 2/1981 | Maejima | |
| 4,296,517 A | 10/1981 | Bohler et al. | |
| 4,454,084 A | 6/1984 | Smith | |
| 5,391,071 A | 2/1995 | Hazarie et al. | |
| 5,395,231 A | 3/1995 | Maejima | |
| 5,456,869 A | 10/1995 | Miles et al. | |
| 5,494,429 A | 2/1996 | Wilson et al. | |
| 5,505,609 A * | 4/1996 | Cloeren et al. | 425/381 |
| 5,511,962 A | 4/1996 | Lippert | |
| 5,582,850 A | 12/1996 | Cloeren et al. | |
| 5,679,387 A | 10/1997 | Cloeren et al. | |
| 5,830,391 A * | 11/1998 | Lamkemeyer et al. | 264/40.1 |
| 6,017,207 A | 1/2000 | Druschel | |
| 6,106,268 A | 8/2000 | Figa et al. | |
| 6,164,948 A | 12/2000 | Cook | |
| 7,074,030 B2 | 7/2006 | Ulcej et al. | |
| 7,104,778 B2 | 9/2006 | Bomba | |
| 2008/0057148 A1 | 3/2008 | Pitch et al. | |

FOREIGN PATENT DOCUMENTS

| | | | |
|---|---|---|---|
| JP | 54097663 A | 8/1979 | |
| JP | 200289081 A | 10/2000 | |

OTHER PUBLICATIONS

English Abstract, Hattori Shigeru, Extrusion Die, JP54097663A2, Aug. 1, 1979, 1 page.
English Abstract, JP2000289081 (A), Oct. 17, 2000, 2 pages.
Machine Translation, JP2000289081 (A), Oct. 17, 2000, 9 pages.

* cited by examiner

*Primary Examiner* — Joseph S Del Sole
*Assistant Examiner* — Lawrence D Hohenbrink, Jr.
(74) *Attorney, Agent, or Firm* — Fredrickson & Byron, P.A.

(57) ABSTRACT

The invention provides a deckle system for extrusion dies. In certain embodiments, the invention provides methods of cleaning an extrusion die equipped with a retractable external deckle system. Also provided in some embodiments is a deckle system having a novel deckle adjustment mechanism. In other embodiments, the invention provides an advantageous internal deckle member equipped with a removable, replaceable internally threaded insert.

23 Claims, 19 Drawing Sheets

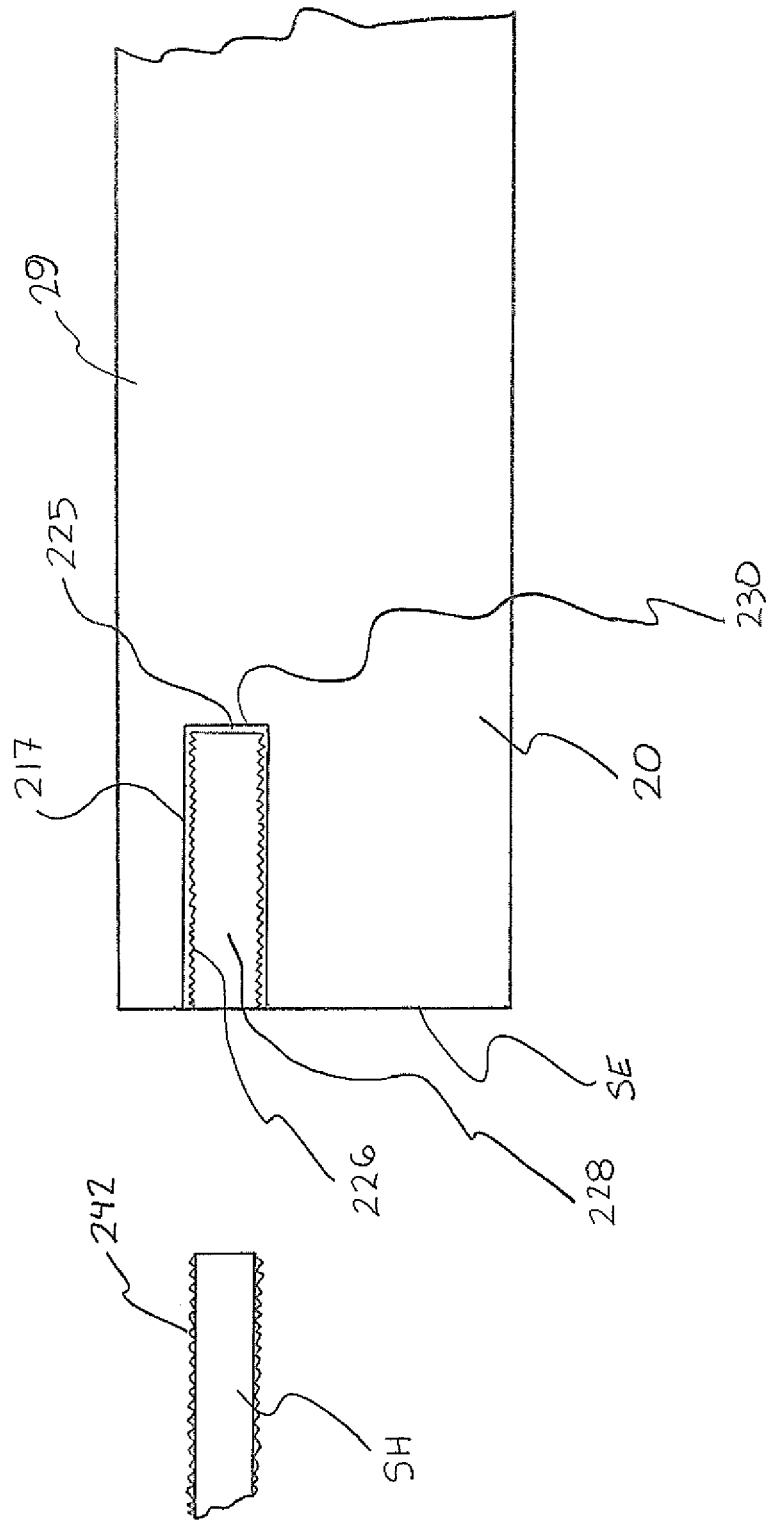

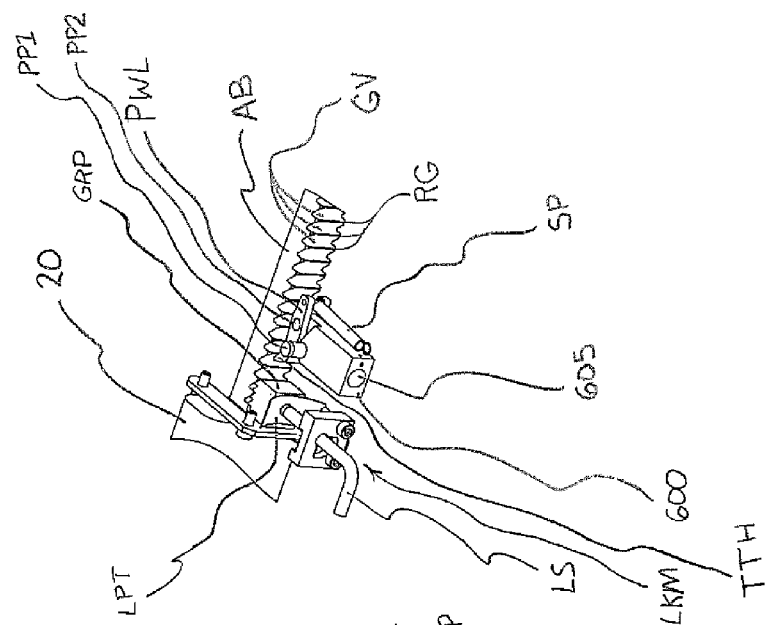
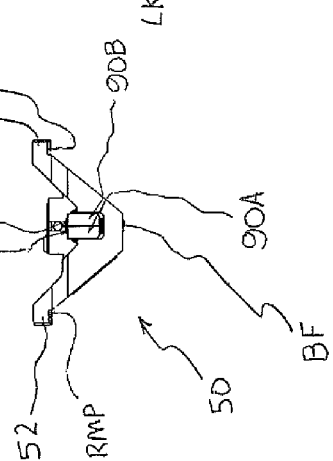
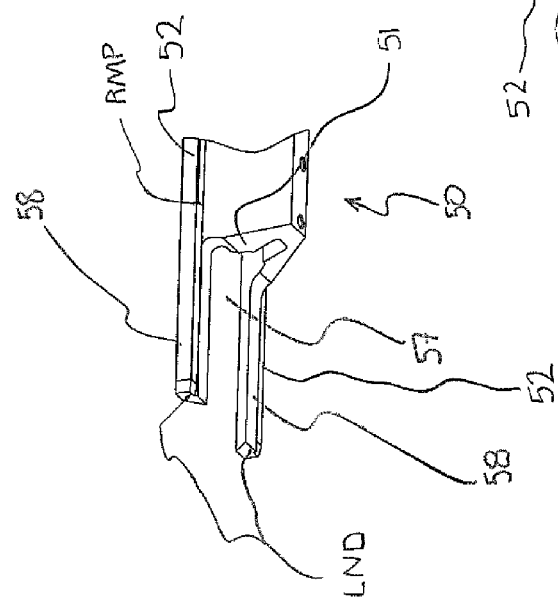

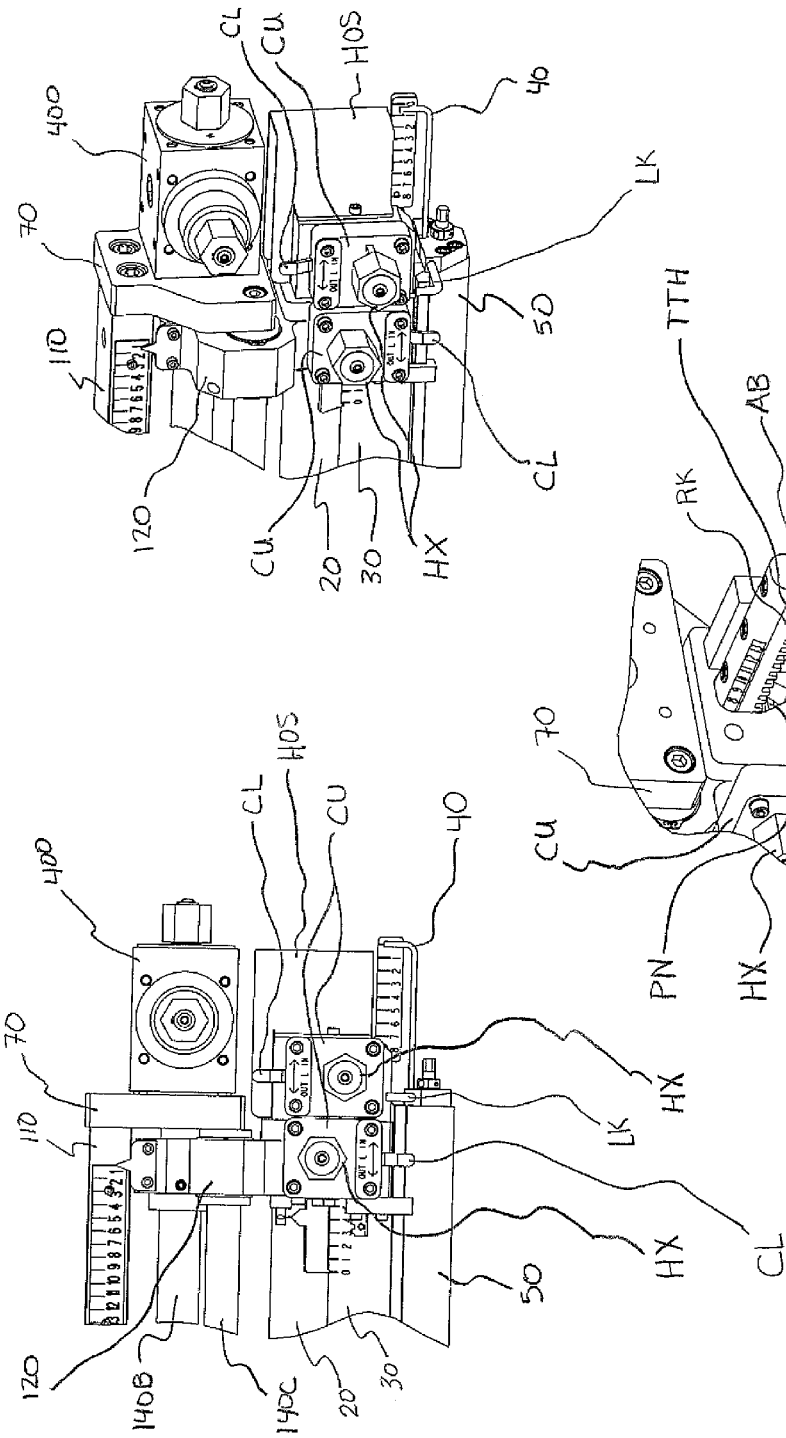
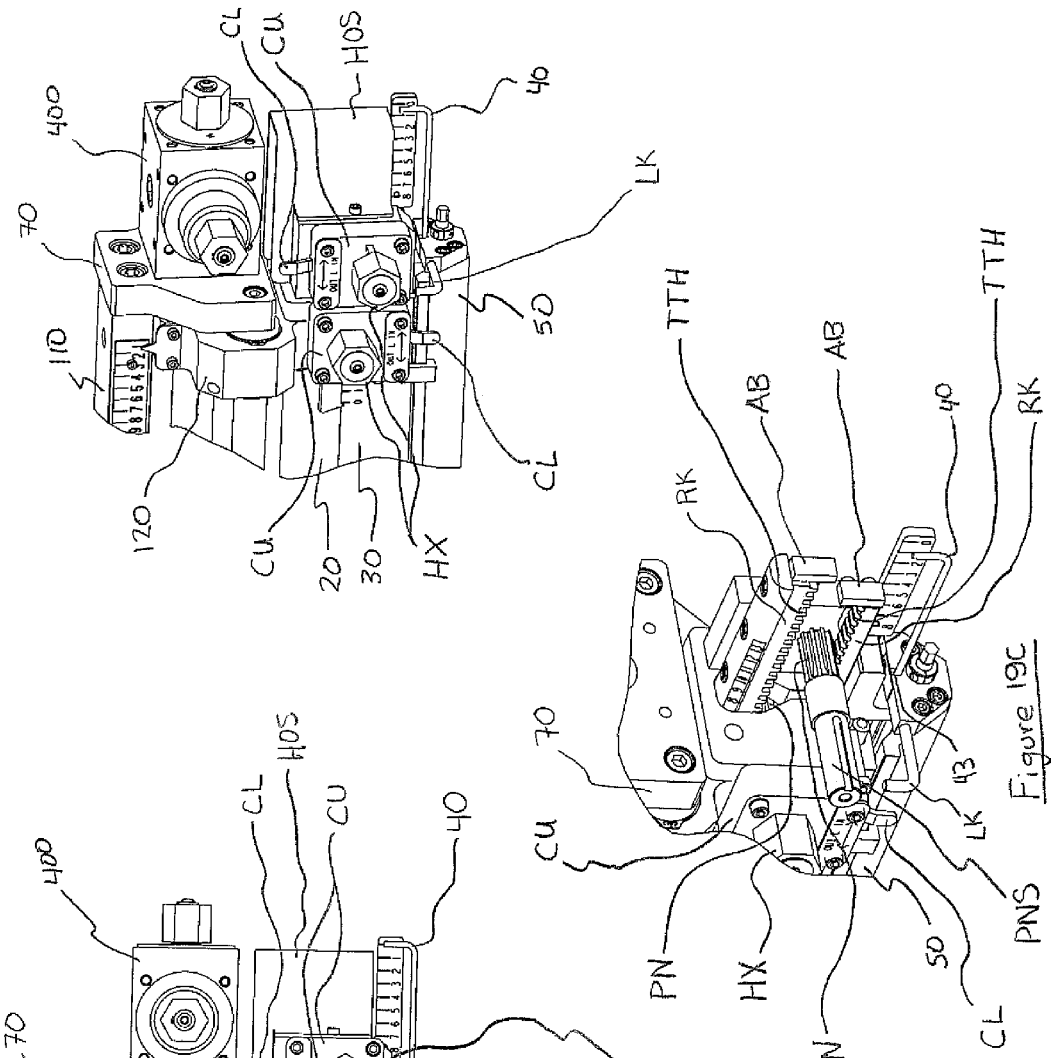
Figure 19A
Figure 19B
Figure 19C

DECKLE TECHNOLOGY

FIELD OF THE INVENTION

The present invention relates generally to deckle systems for dies. Specifically, this invention relates to internal and external deckles for extrusion dies.

BACKGROUND OF THE INVENTION

A variety of deckle systems are known for extrusion dies. A deckle system defines the width of the extrudate, as is well known to people skilled in this area of technology. The deckles on an extrusion die may be internal, external, or both.

One problem with conventional deckle systems is that cleaning may require substantial time and effort. For example, the operator may need to spend long periods of time taking apart the deckle system, and removing it from the die, before it is possible to clean the transition zone connecting the preland channel and the final land channel. Depending on the particular die/deckle being used, it may take on the order of 1-2 hours to perform a single cleaning. Given the importance of lean production in today's manufacturing environment, the need to disassemble a deckle prior to cleaning is a considerable drawback.

With respect to external deckles, U.S. Pat. Nos. 3,797,987 and 5,830,391 show external deckles where a sealing bar is pressed against, and thereby blocks, the die orifice. The sealing bar, however, does not extend into the orifice or into the final land channel. Instead, the sealing bar is merely seated against the outside of the orifice. As a consequence, the results achieved with external deckles of this nature may be less than ideal.

With respect to internal deckles, the conventional mechanisms that are used to adjust the positioning of internal deckles could be improved in many cases. For example, it would be desirable to provide deckle adjustment mechanisms that can provide relatively rapid travel of an internal deckle during adjustment.

Further, it is common to have an internal deckle blade that defines an internally threaded bore adapted to receive an externally threaded control shaft. While this arrangement has generally been acceptable, the internal threading of the deckle blade is sometimes damaged. If the damage is severe enough, then the whole deckle blade may need to be replaced, even though the rest of the deckle blade may be in good condition. Needless to say, this is wasteful and expensive.

BRIEF DESCRIPTION OF THE DRAWINGS

FIG. 15 is a partially broken-away cross-sectional view of an internal deckle member having an interior bore in which a removable internally threaded sleeve is mounted in accordance with certain embodiments of the invention.

FIG. 16A is a partially broken-away perspective view of a leading end region of an external deckle in accordance with certain embodiments of the invention.

FIG. 16B is a perspective detail view of a subassembly that serves as a deckle adjustment mechanism in accordance with certain embodiments of the invention.

FIG. 16C is an end view of the external deckle of FIG. 16A.

FIG. 19A is a partially broken-away front elevation view of yet another deckle system in accordance with certain embodiments of the invention.

FIG. 19B is a front perspective view of the deckle system of FIG. 19A.

FIG. 19C is another front perspective view of the deckle system of FIG. 19A, with an exterior housing removed to show internal workings.

SUMMARY OF THE INVENTION

Figure 1:
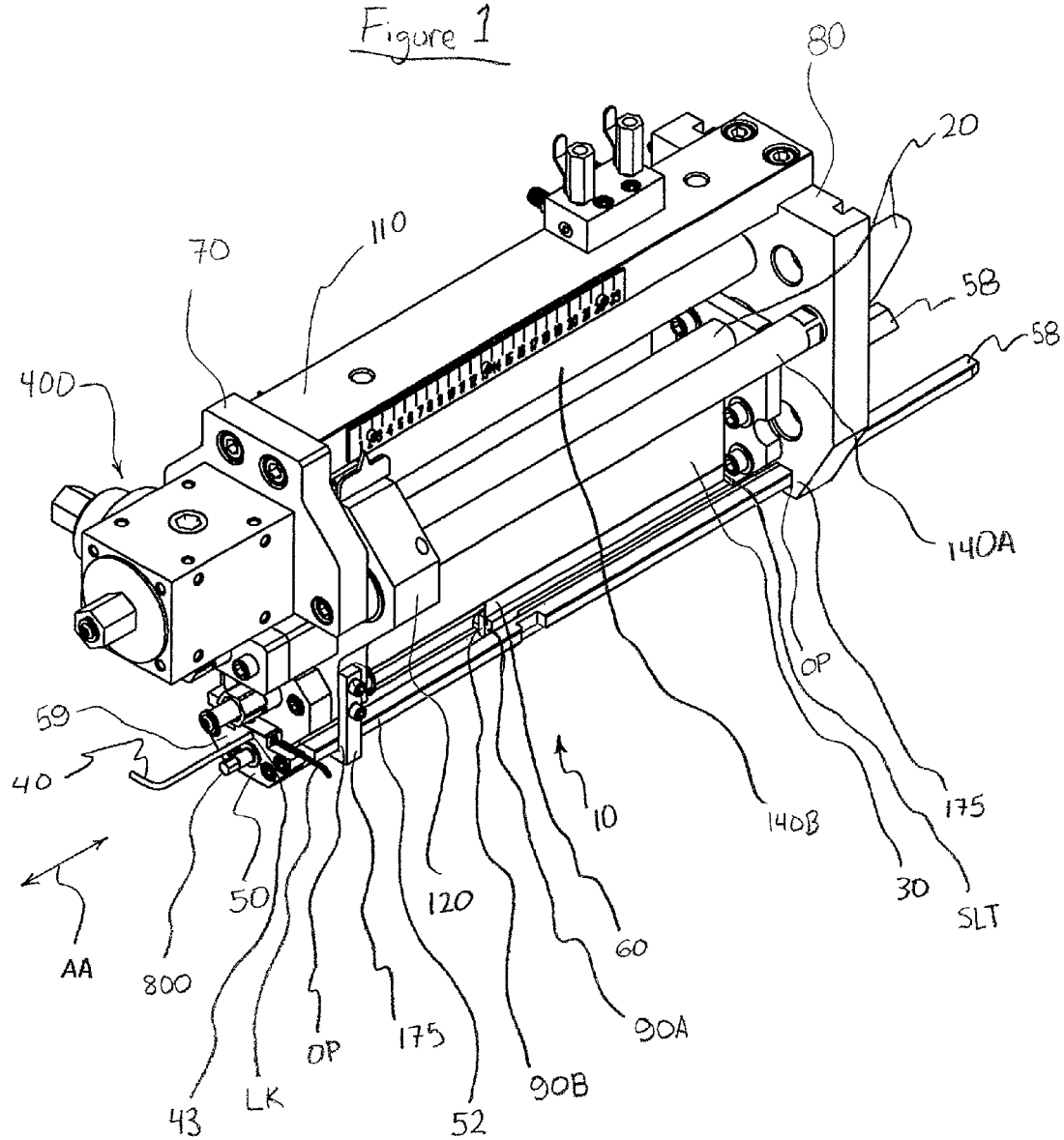
FIG. 1 is a perspective view of a deckle system in accordance with certain embodiments of the present invention.

In certain embodiments, the invention provides an extrusion die equipped with a deckle system. In the present embodiments, the die preferably has a manifold, a preland channel, a final land channel, and an orifice, wherein a transition zone extends from a downstream end region of the preland channel to an upstream end region of the final land channel. In the present embodiments, the deckle system includes an external deckle comprising a retractable base mounted so as to be moveable transversely relative to the die, such that the base can be moved transversely away from the orifice far enough to expose a cleaning access through which a scraper can be inserted as part of a process for moving the scraper into and transversely along the die to clean unwanted material from the transition zone The cleaning access is spaced transversely away from the die.

Some embodiments of the invention provide a deckle system that includes an external deckle and an end plate. In the present embodiments, the end plate is configured to be mounted on an end of a die. Preferably, the external deckle comprises a retractable base that is moveable transversely relative to the end plate, such that the retractable base can be moved transversely away from the end plate so as to expose a cleaning access into which a scraper can be inserted. Preferably, a slot opening passing transversely through the end plate opens to the cleaning access, such that an access path for the scraper extends through the cleaning access and transversely along the slot opening.

Certain embodiments of the invention provide a method of cleaning an extrusion die. In some of the present methods, the die has a manifold, a preland channel, a final land channel, and an orifice, wherein a transition zone extends from a downstream end region of the preland channel to an upstream end region of the final land channel. In the present method, the die is equipped with a deckle system that includes an external deckle comprising a retractable base mounted so as to be moveable transversely relative to the die, such that the base can be moved transversely away from the orifice far enough to expose a cleaning access that is spaced transversely away from the die. The method comprises inserting a scraper into the cleaning access and moving the scraper transversely along the die to clean unwanted material from the die's transition zone.

In some embodiments, the invention provides an extrusion die equipped with an external deckle. Preferably, the die has a manifold, a preland channel, a final land channel, and an orifice. In the present embodiments, the external deckle has a blade that projects from outside of the orifice, through the orifice, and into the final land channel, e.g., such that the blade does not extend into the preland channel but rather has an upstream edge that terminates in the final land channel.

The invention in certain embodiments provides a deckle system that includes an external deckle comprising a transversely moveable base. In the present embodiments, a blade projects from the base and is configured to extend through an orifice, and into a final land channel, of a die to which the deckle system can be mounted. Preferably, the blade is mounted removably on the retractable base.

In certain embodiments, the invention provides a deckle system having a novel deckle adjustment mechanism. In the present embodiments, the deckle adjustment mechanism includes an adjustment beam having a series of detent recesses spaced along a transverse length of the beam. Here, the deckle adjustment mechanism includes a lever device operably coupled with an engagement tooth, wherein by engaging the tooth with a desired one of the detent recesses and pivoting the lever device in a first direction the adjustment beam can be moved in a transverse inward direction.

The invention in some embodiments provides a method of adjusting deckle position on a die equipped with a deckle system. In the present method, the deckle system includes a deckle adjustment device comprising an adjustment beam having a series of detent recesses spaced along a transverse length of the beam. Here, the deckle system includes an internal deckle member operably coupled to the adjustment beam. In the present method, the deckle system has a detent mechanism comprising a lever device operably coupled with an engagement tooth. The present method comprises engaging the tooth with one of the detent recesses and pivoting the lever device in a first direction so as to bias the adjustment beam and thereby move the beam transversely inwardly, whereby the internal deckle member is made to move transversely inwardly together with the adjustment beam.

In certain embodiments, the invention provides an internal deckle member for an extrusion die. In the present embodiments, the deckle member comprises an elongated deckle body defining a transverse opening that opens through a side end of the deckle body and extends inwardly into the deckle body. Here, an internally threaded sleeve is mounted within the blind opening and defines an internally threaded passageway for receipt of a correspondingly externally threaded shaft. The sleeve is mounted removably within the opening such that if internal threads of the sleeve are damaged, then the sleeve can be removed and replaced with a replacement internally threaded sleeve.

Some embodiments of the invention provide a deckle system comprising a stationary beam and a movable deckle carrier configured to move transversely along the stationary beam. In the present embodiments, a novel deckle adjustment mechanism is provided on the moveable deckle carrier. Here, the deckle adjustment mechanism includes an adjustment beam comprising a rack with a series of teeth spaced along a transverse length of the rack. The present deckle adjustment mechanism also includes a pinion operably coupled with the rack, such that rotating the pinion in a first direction causes the adjustment beam to move in a transverse inward direction, whereas rotating the pinion in a second direction causes the adjustment beam to move in a transverse outward direction. Preferably, the adjustment beam is operably coupled to an internal deckle such that the internal deckle is configured to move transversely conjointly with the adjustment beam. In the present embodiments, the deckle adjustment mechanism comprises a control unit having a locked configuration, a first adjustment configuration, and a second adjustment configuration. When the control unit is in its locked configuration, the internal deckle is locked against movement in either transverse direction; when the control unit is in its first adjustment configuration, the internal deckle is locked against outward transverse movement but is free to move transversely inwardly in response to rotation of the pinion in the first direction; when the control unit is in its second adjustment configuration, the internal deckle is locked against inward transverse movement but is free to move transversely outwardly in response to rotation of the pinion in the second direction.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the given examples have many useful alternatives, which fall within the scope of the invention.

Figure 11:
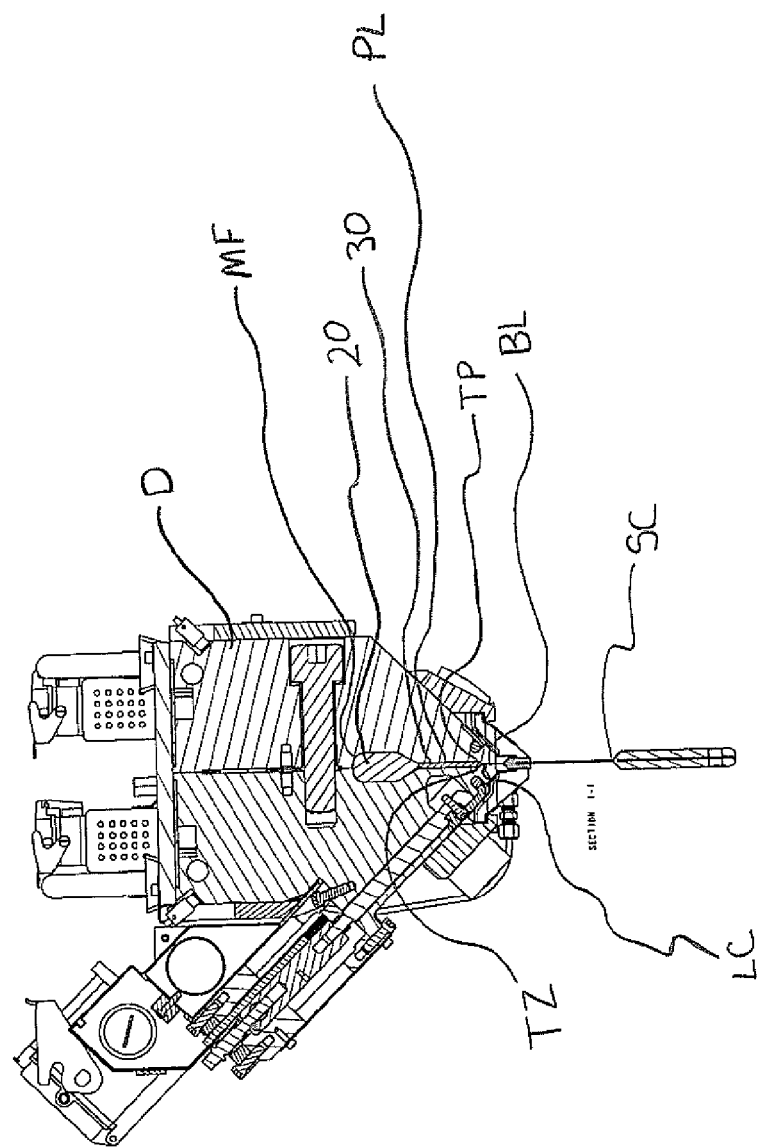
FIG. 11 is a cross-sectional view of the die of FIG. 10, showing the scraper positioned in the die.

The invention provides a number of novel technologies and features for internal and external deckle assemblies. In a first group of embodiments, the invention provides an external deckle for use on an extrusion die. The die D can be provided in any of a variety of conventional forms, as are well known to those skilled in this field. Generally, the die has a manifold MF, a preland channel PL, a final land channel LC, and an orifice. Preferably, a transition zone TZ connects the preland channel PL and the final land channel (e.g., a transition zone may extend from a downstream end region of the preland channel to an upstream end region of the final land channel). The transition zone may comprise two confronting radiused (or otherwise tapered) wall sections, optionally extending from confronting upstream preland wall sections (which may define a preland channel that is wider than the final land channel) to confronting downstream final land wall sections (which may define a final land channel that is more narrow than the preland channel). Reference is made to FIG. 11. The external deckle can be used with a variety of different extrusion dies, so the particulars of the die itself are not limiting to the invention.

In the present embodiments, the external deckle comprises a retractable base 50 mounted so as to be moveable transversely (e.g., along a transverse axis, as shown by arrows AA in FIG. 1) relative to the die. Preferably, the retractable base 50 can be moved transversely relative to the die D such that (when the external deckle is in an unlocked configuration), without having to disassemble the external deckle (or the die), the base can be moved (e.g., independently of deckle carrier 120) transversely away from the orifice far enough to expose a cleaning access 57 through which a scraper SC can be inserted as part of a process for moving the scraper into and transversely along the die to clean unwanted material from the transition zone of the die.

Reference is made to FIGS. 7-10. Here, the external deckle has a locked configuration and an unlocked configuration. When the illustrated external deckle is in its locked configuration, the retractable base 50 is locked to the movable deckle carrier 120. Thus, when the external deckle is in its locked configuration, the retractable base 50 is configured to move transversely together with (or "conjointly with") the deckle carrier 120. In contrast, when the illustrated external deckle is in its unlocked configuration, the retractable base 50 is free to move (e.g., slide) transversely relative to (i.e., independent of) the deckle carrier 120.

Figure 5:
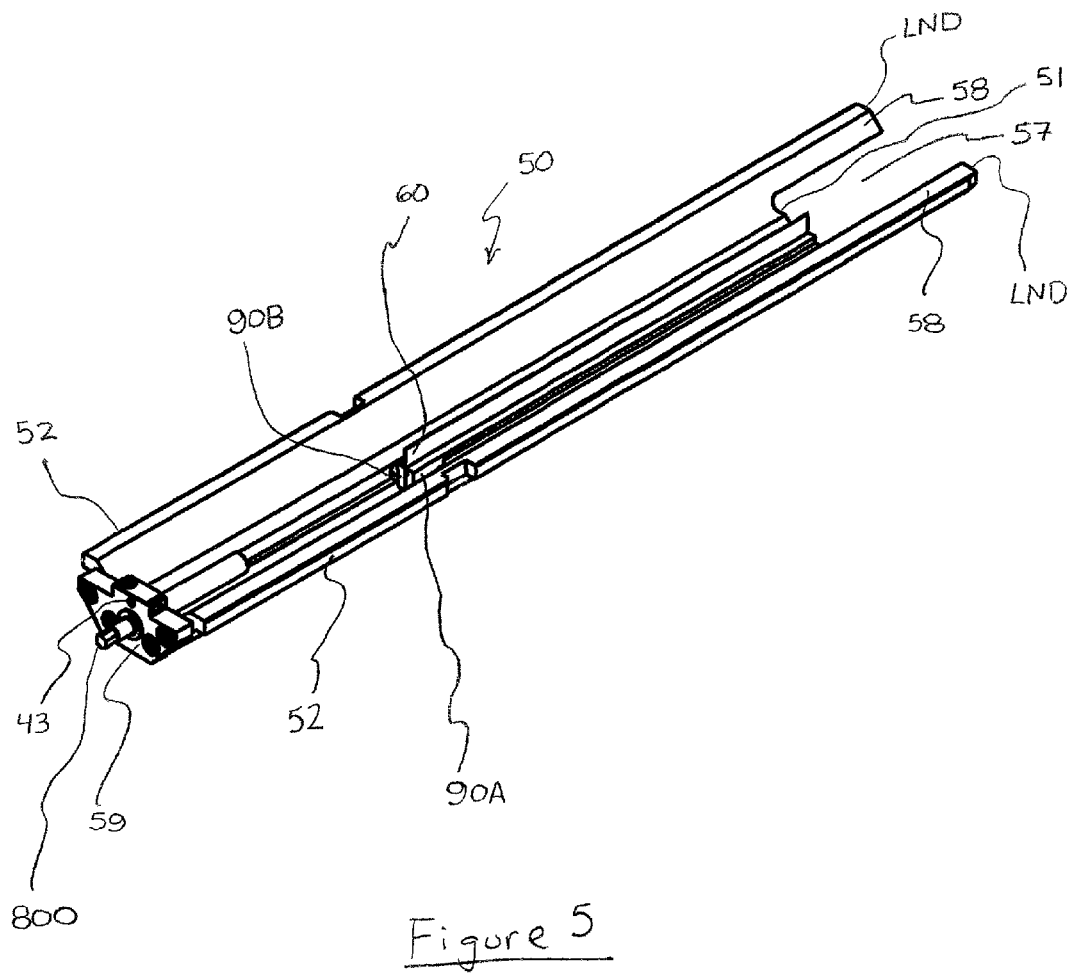
FIG. 5 is a perspective view of an external deckle system in accordance with certain embodiments of the invention.
Figure 6:
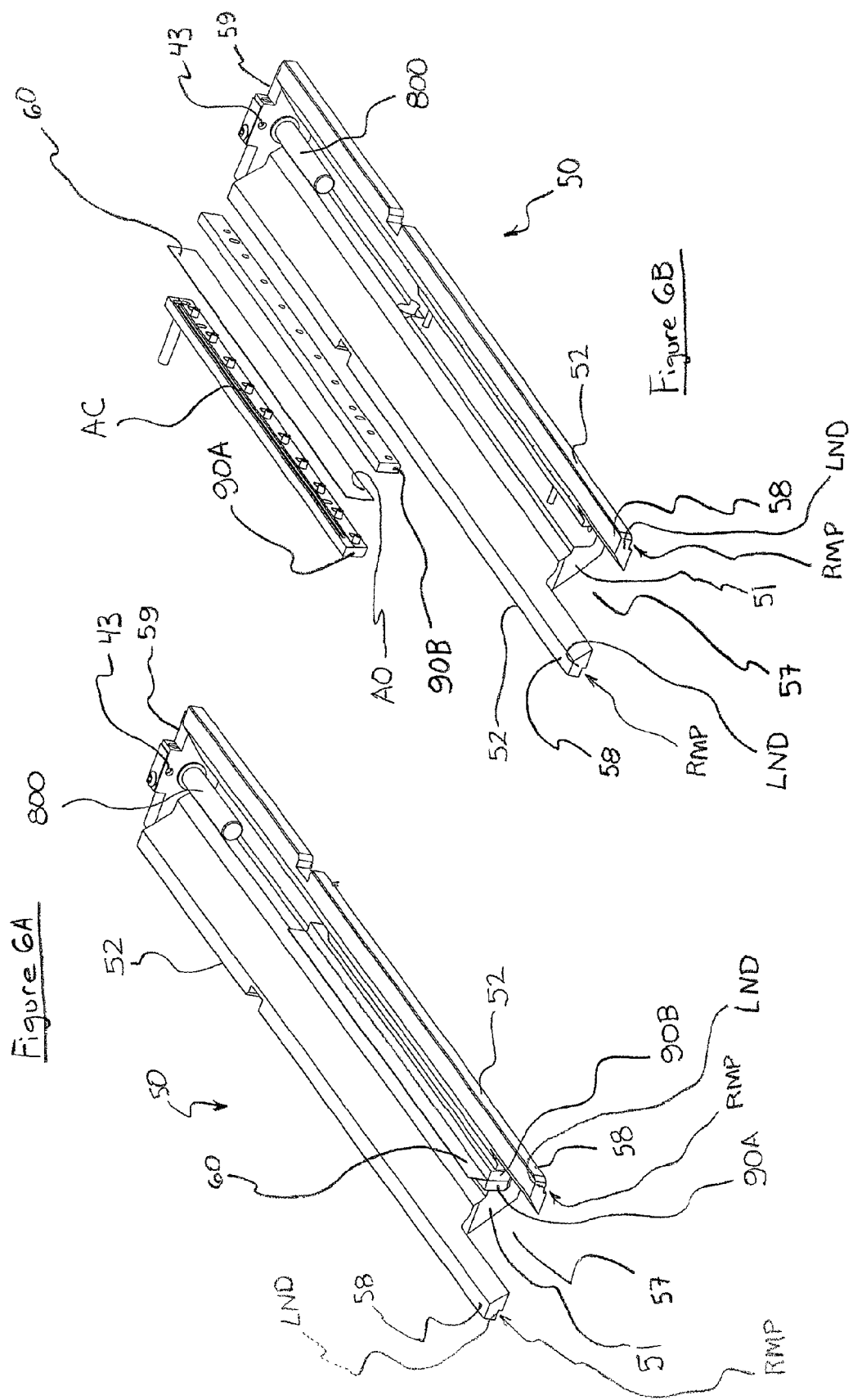
FIG. 6A is another perspective view of the external deckle system of FIG. 5.
FIG. 6B is an exploded perspective view of the external deckle system of FIG. 5.
Figure 7:
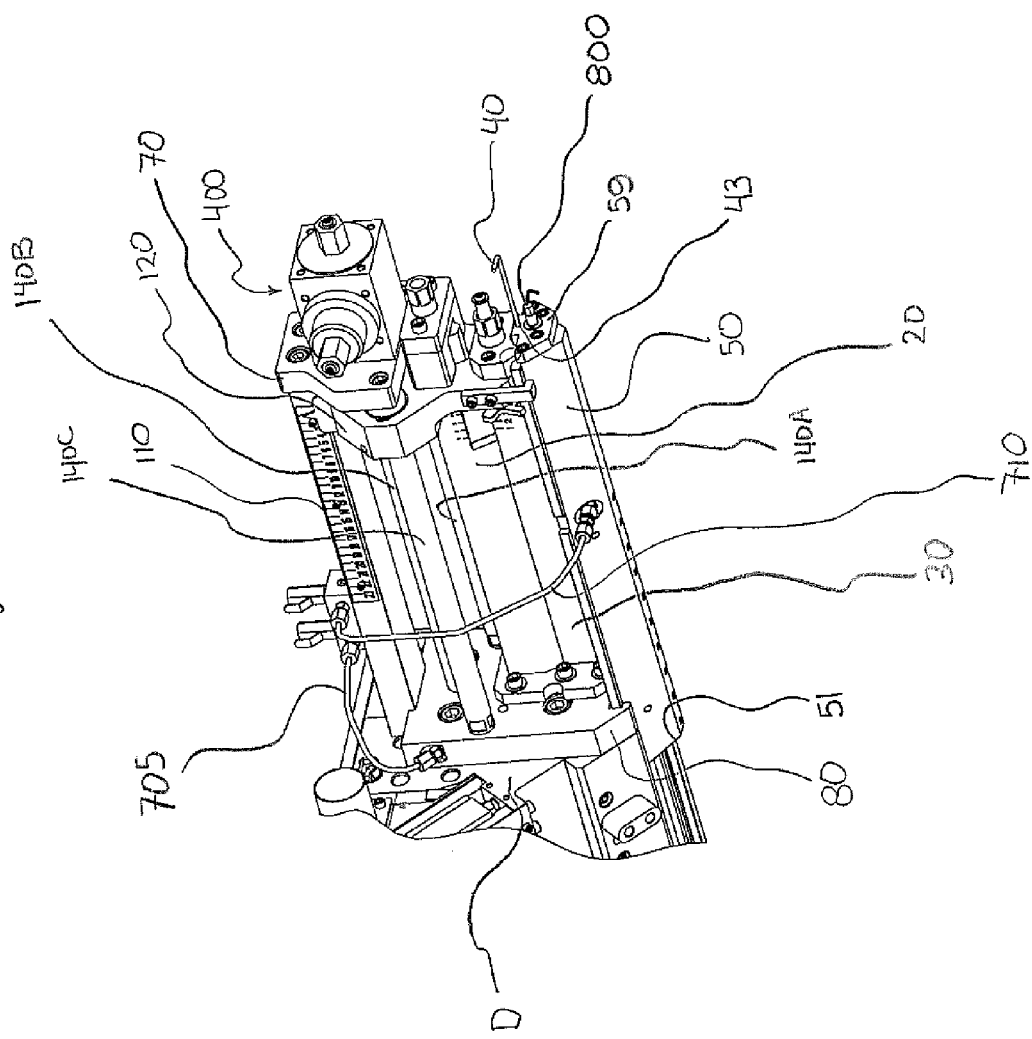
FIG. 7 is a front perspective view of a deckle system mounted operatively on a die in accordance with certain embodiments of the invention.

In the illustrated design, the retractable base 50 can be selectively locked to, or unlocked from, the deckle carrier 120 by virtue of a releasable connection. For example, an exteriorly threaded fastener 800 can be mounted on the retractable base 50 so as to be extendable into an interiorly threaded opening of the deckle carrier 120. By rotating the fastener 800 far enough in a first direction (e.g., counterclockwise), the fastener can be separated from the carrier's interiorly threaded opening, thus unlocking the base 50 from the deckle carrier 120. This is perhaps best appreciated by referring to FIGS. 5, 6A, 7, and 17B. In FIGS. 5, 6A, and 6B, the threads on the illustrated fastener 800 are not shown, but they would be provided on the exterior of the fastener. It is to be appreciated that this is merely one exemplary releasable connection that can be used for providing the external deckle with locked and unlocked configurations. Various other releasable mechanical, magnetic, etc. connections could be used.

Figure 8:
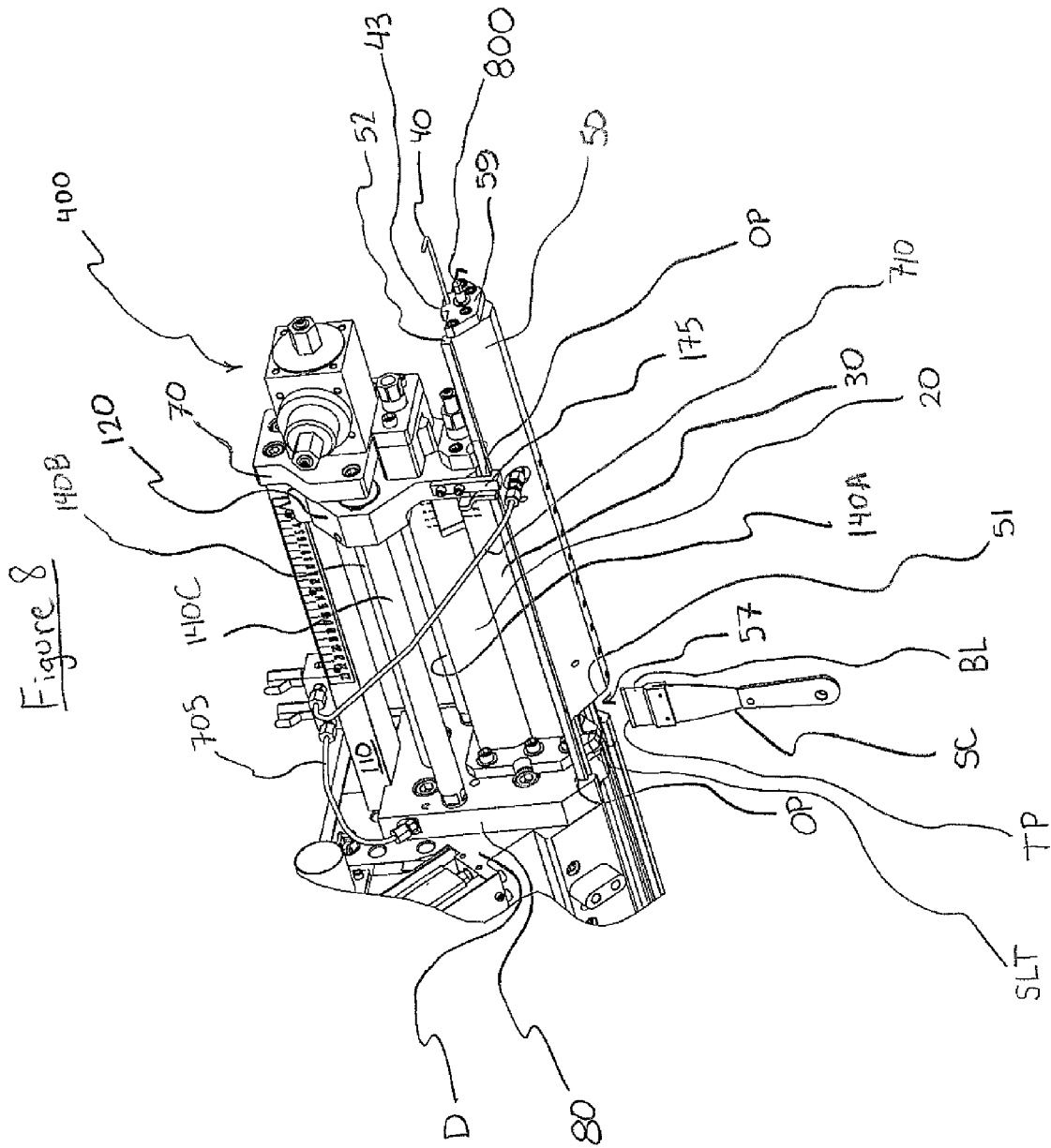
FIG. 8 is a front perspective view of the deckle and die of FIG. 7, with the external deckle shown in a retracted cleaning position.

As is perhaps best seen in FIG. 8, the cleaning access 57 preferably is spaced transversely away (i.e., apart) from the die D. That is, the cleaning access 57 preferably is at a location external to the die D. Thus, the illustrated cleaning access 57 is defined by the deckle system 10, not by the die D. In some embodiments, the cleaning access 57 is located transversely away from (e.g., outwardly of) an end plate 80 of the deckle system 10. More will be said of this later.

With continued reference to FIG. 8, when the illustrated cleaning access 57 is exposed (by moving the base 50 transversely away from the orifice), the cleaning access is bounded by a first end region 51 of the base. The illustrated base 50 has an elongated configuration with opposed first 51 and second 59 end regions. The first end region 51 is adjacent to the die D, and the second end region 59 is remote from the die. In the illustrated embodiments, the retractable base 50 is elongated in a direction parallel to a transverse length of the die's orifice (e.g., parallel to the deckle system's transverse axis AA).

With many conventional deckle systems, before it is possible to clean the die (e.g., a transition zone thereof), it is necessary to perform some disassembly of the deckle system, the die, or both. In such cases, it may take 1-2 hours to perform a single cleaning. The need to spend considerable time on disassembly prior to cleaning is a significant problem, particularly given the importance of lean manufacturing.

To address this problem, the present embodiments provide a deckle system that allows the die D to be cleaned without first having to disassemble the deckle system. In the illustrated preferred embodiments, this is accomplished by providing an external deckle that can be readily moved (e.g., transversely away from the die) so as to expose a cleaning access 57. Preferably, when the external deckle is in an unlocked configuration, it can be moved transversely outwardly relative to (e.g., independent of) a movable deckle carrier 120 of the deckle assembly so as to expose the cleaning access 57. As will be appreciated by those skilled in the present field, this is a great benefit since it eliminates a complication that has plagued many conventional deckle systems.

Figure 2:
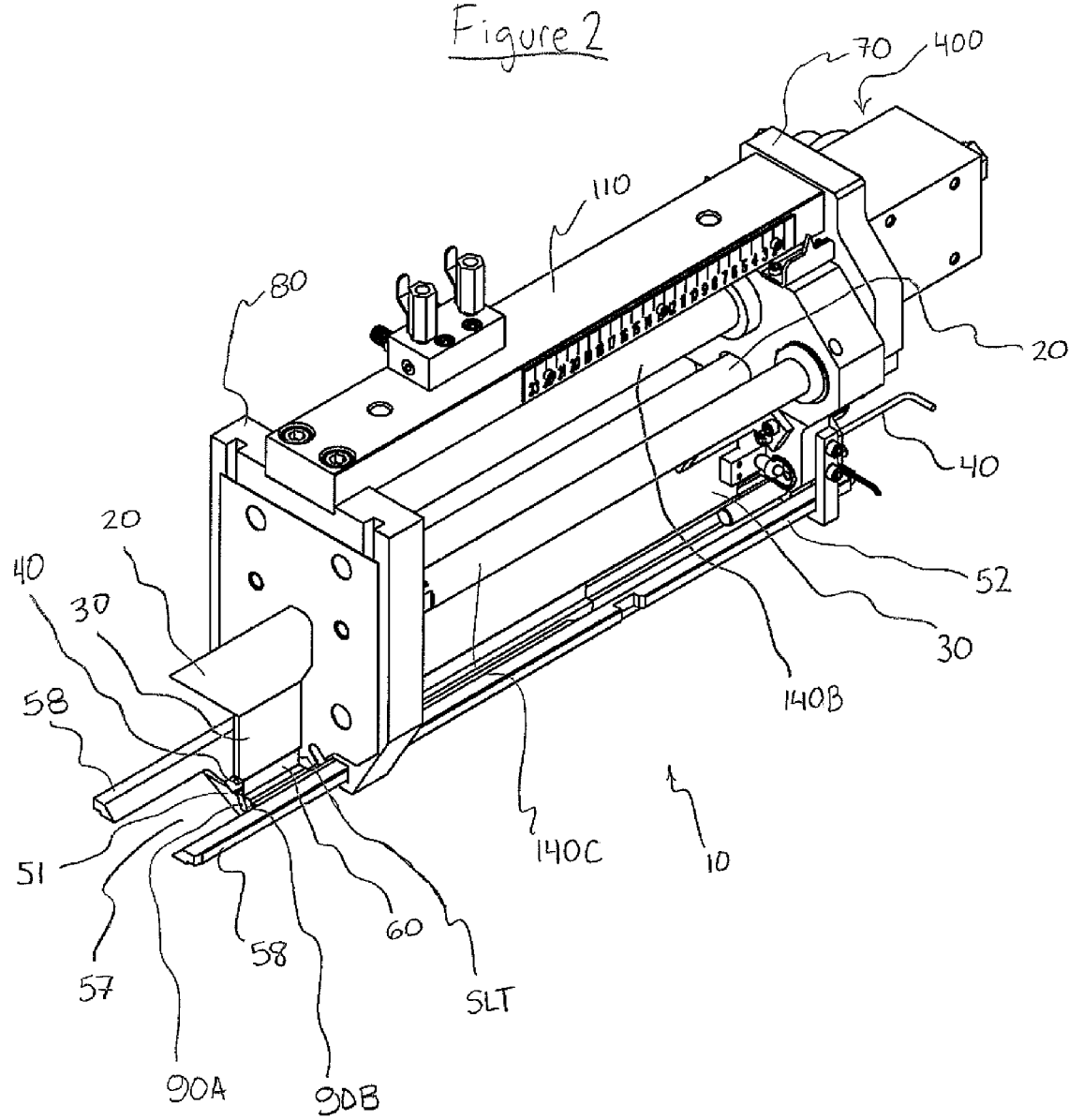
FIG. 2 is another perspective view of the deckle system of FIG. 1.
Figure 3:
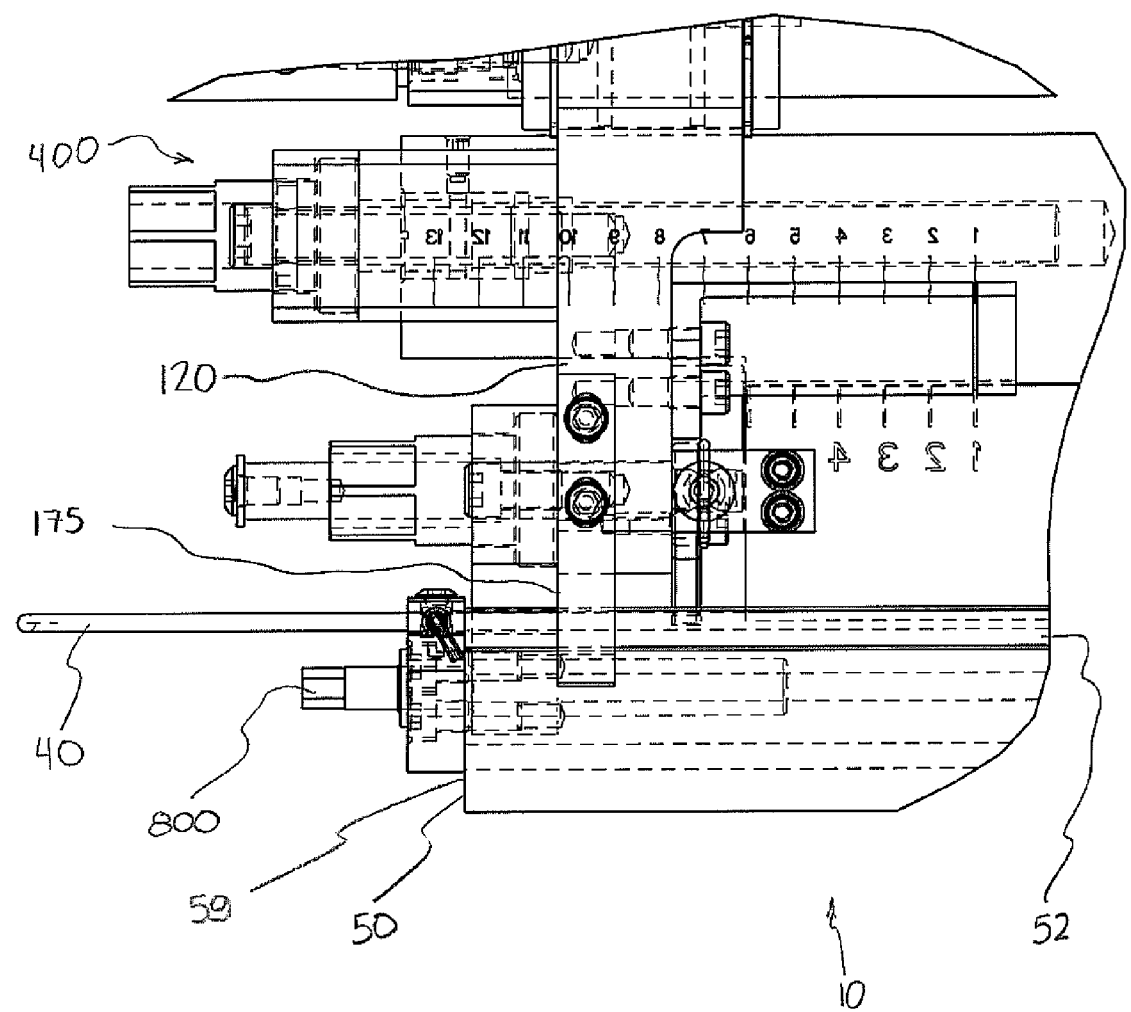
FIG. 3 is a partially broken-away elevation view of the distal end region of the deckle system of FIG. 1.
Figure 4:
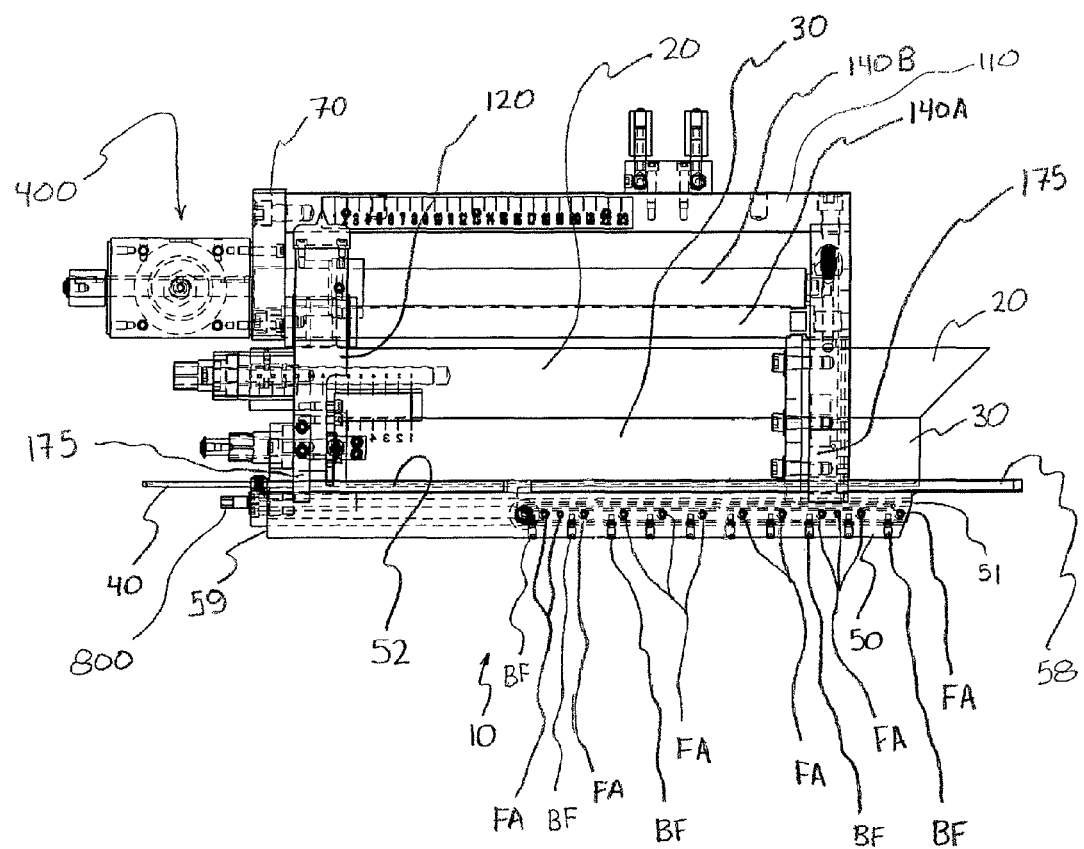
FIG. 4 is a elevation view of the deckle system of FIG. 1.

Referring to FIGS. 1 and 2, the retractable base is identified by reference numeral 50. The base 50 is mounted on the deckle system 10 so as to be movable (e.g., slidable) transversely relative to the die (and/or relative to an end plate 80 of the deckle system). In the embodiment illustrated, the retractable base 50 is mounted slidably within mount openings OP defined by respective bodies 175 of the deckle system 10. Preferably, the deckle system 10 includes an end plate 80 configured to be carried adjacent to (e.g., mounted to, whether directly or via intermediate structure) an end of the extrusion die D. In the embodiment of FIGS. 1 and 2, the end plate 80 (e.g., support regions 175 thereof) defines two mount openings OP for the retractable base 50. Here, the two mount openings OP are located adjacent to (e.g., at) the "die side" of the deckle system 10. Alternatively, such mount openings can be defined by bodies located further away from the die. Preferably, the base 50 is mounted slidably in the mount openings OP, as is perhaps best appreciated by comparing FIGS. 7 and 8.

Thus, the deckle system 10 can advantageously include an end plate 80 mounted (directly or indirectly) to an end of the die D. In preferred embodiments, a slot opening SLT passes transversely through the end plate 80 and opens to the cleaning access 57 (e.g., when the external deckle is in a retracted position such that the cleaning access is exposed). This is perhaps best appreciated by referring to FIG. 8. Here, an access path for the scraper SC extends through the cleaning access 57 (the cleaning access is optionally configured to provide a scraper ingress path that is generally or substantially parallel to the "machine direction," which is the general direction of extrudate flow through the die), transversely along the slot opening SLT, and into the die's transition zone and final land channel. In more detail, the illustrated slot opening SLT opens to, and extends between (e.g., connects), the cleaning access 57 on one side and the die's transition zone and final land channel on another side.

In the embodiments illustrated, the deckle system 10 has a moveable deckle carrier 120 that provides two further mount openings OP for the retractable base 50. These two mount openings OP are adjacent to (e.g., at) the "distal side" of the deckle system 10. The term "distal" here refers to an end, a side, etc. that is remote from the die D and/or remote from a die-side end plate 80 of the deckle system 10. Thus, the illustrated base 50 is mounted in two sets of mount openings OP defined respectively by at least one stationary support 175/80 adjacent to the die side of the deckle system 10 and at least one moveable support 175/120, which preferably is closer to the distal end of the deckle system than is the stationary support body. By "stationary," it is meant that support 175/80 is configured to remain in a stationary position at all times when the deckle system 10 is operatively mounted to the die. "Moveable" here refers to the moveable support 175/120 being configured to move transversely relative to the fixed support 175/80. Such movement occurs when the deckle carrier 120 is moved transversely, which can be done to transversely position one or more internal deckles 20, 30 relative to the die (so as to adjust the die's extrudate width).

The illustrated deckle carrier 120 is configured for transverse movement relative to (e.g., selectively toward or away from) the die D and/or an end plate 80 of the deckle system. In the embodiment illustrated, the deckle carrier is mounted for transverse movement along a plurality of transverse support beams 140A-C. Here, the beams extend between an end plate 80 that is configured for mounting to the die and a second, distal end plate 70, which is adjacent to the distal end of the deckle system 10. Both end plates 80, 70 preferably are fixed (i.e., stationary during use). The beams can advantageously be parallel to each other and generally perpendicular to the end plates and deckle carrier. The illustrated deckle system 10 has three support beams 140A-140C, and they are each elongated generally cylindrical beams. Here, beam 140B (the "drive shaft") is threaded, while beams 140A, 140C are smooth. In the illustrated deckle system, a stationary frame member 110 extends between, and connects, the two end plates 70, 80.

Thus, the deckle carrier 120 can advantageously comprise a body (e.g., a plate, block, platen, or an arm) through which extend a plurality of transverse openings, optionally circular openings, in which respective beams are slidably and/or threadingly mounted such that the carrier is movable transversely along the beams. While these details are not limiting to the invention, arrangements of this nature are believed to provide particularly quiet, stable, and easy adjustment of the deckle carrier's transverse position. Thus, these beam/carrier features can advantageously be provided in any embodiment of the present disclosure.

The deckle carrier 120 can be moved transversely by any conventional hydraulic or mechanical drive system 400. In the illustrated designs, the drive beam 140B is threaded and is received in an interiorly threaded wall of the moveable carrier 120, such that rotating the drive shaft in one direction (e.g., clockwise) forces the carrier 120 to move transversely in the inward direction, while rotating the beam in an opposite direction (e.g., counterclockwise) forces the carrier to move transversely in the outward direction. Drive system 400 can comprise a conventional gear box, or a conventional motor can be provided.

Preferably, at least one internal deckle member 20, 30 is mounted to the movable carrier 120 such that in response to transverse movement of the carrier, the transverse position of the (or each) internal deckle member is adjusted. For example, the distal ends of such internal deckle members 20, 30 can be connected (or adapted for being connected) to the carrier 120, directly or via an intermediate mounting structure (which may be part of a deckle adjustment system). In the embodiments illustrated, connected to the deckle carrier 120 are both a deckle quill 20 and a secondary flag 30. Here, the quill 20 and flag 30 are removably mounted to the carrier 120, such that transverse movement of the carrier causes both of these internal deckle members 20, 30 to move transversely relative to the die (and/or relative to an end plate 80 of the deckle system 10). In other cases, there may be only one internal deckle operatively connected to the carrier. Further, it will be appreciated by skilled artisans that the particular shape and configuration of the internal deckle member(s) will vary depending upon the particulars of the die being used, the product being made, etc.

Figure 9:
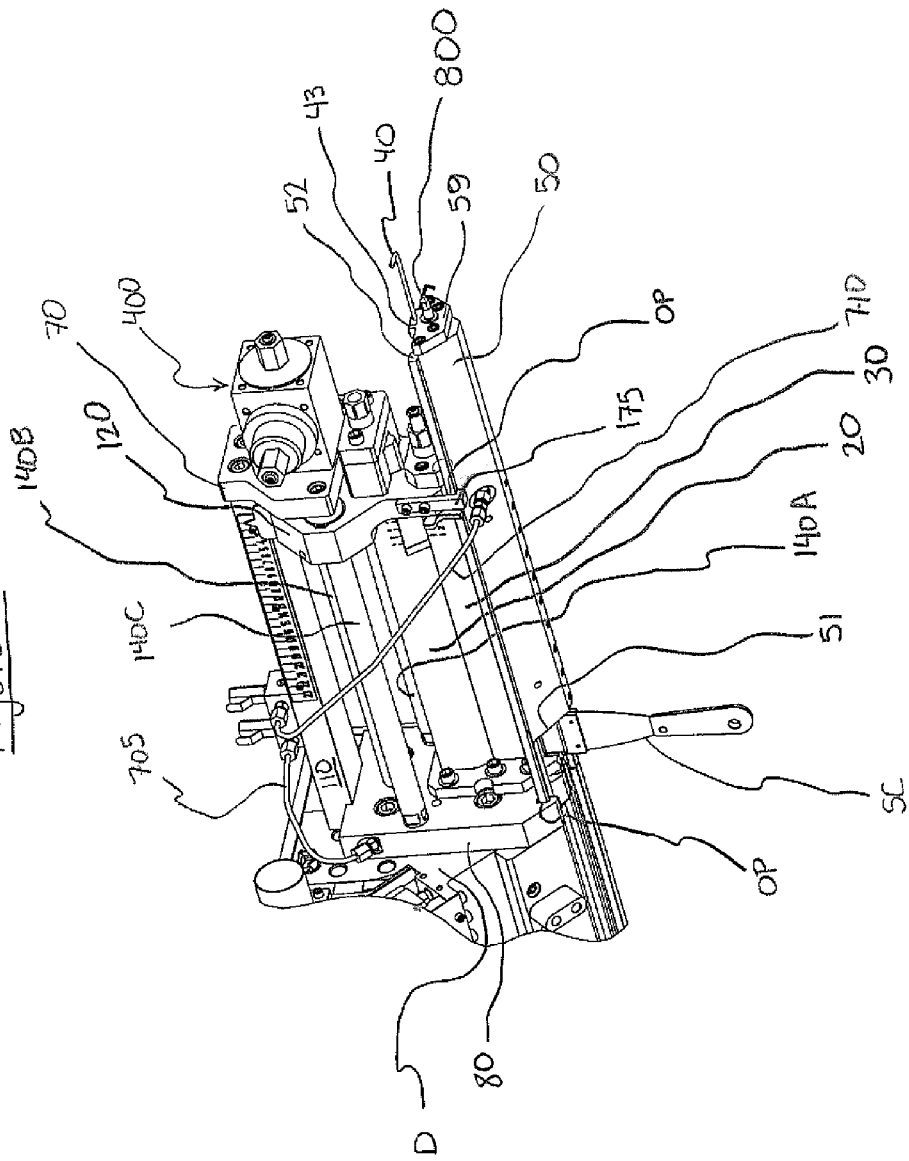
FIG. 9 is a front perspective view of the deckle and die of FIG. 7, with the external deckle shown in the retracted cleaning position and a scraper positioned in a cleaning access of the deckle.
Figure 10:
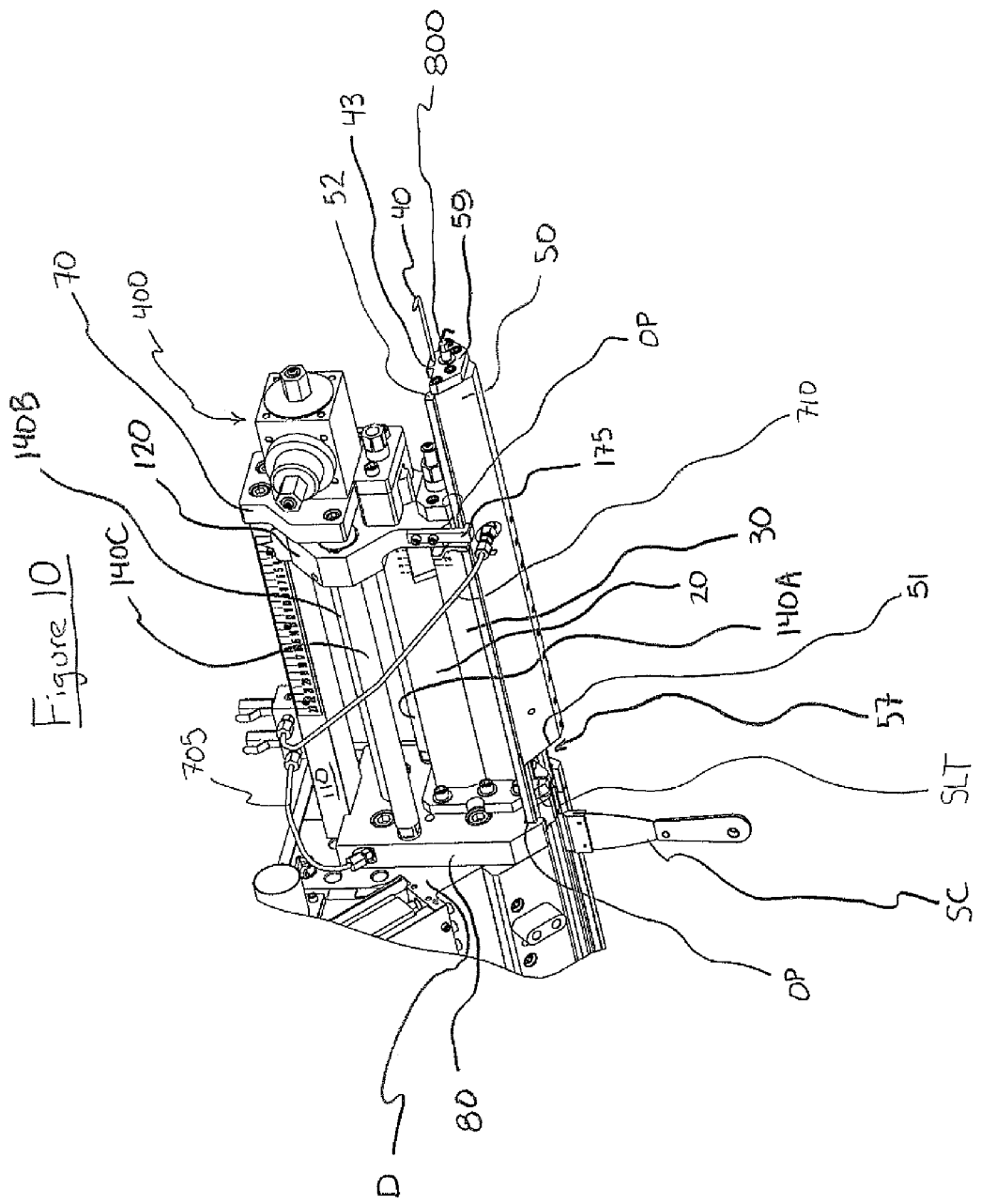
FIG. 10 is a front perspective view of the deckle and die of FIG. 7, with the external deckle shown in the retracted cleaning position and the scraper positioned in the die.

Preferably, the external deckle (e.g., a retractable base 50 thereof) has a first configuration in which it is locked to the carrier 120, and a second configuration in which it is free to move transversely relative to the carrier. FIGS. 1-4 show the first configuration (or "locked configuration") of one such external deckle, and FIGS. 8-10 show the second configuration (or "unlocked configuration"). In FIGS. 1-4, 7, 17A, 17B, 18A-C, and 19A-C, the illustrated external deckle can be locked to the movable carrier 120 by virtue of a releasable connector (e.g., fastener) 800. Thus, when the external deckle is in its locked configuration, it is secured (e.g., rigidly) to the carrier 120 so as to move together with the carrier along the transverse axis AA (see FIG. 1).

Preferably, the connector 800 can be used to unlock the external deckle from the carrier 120. The illustrated connector 800 is a rotatable bolt mounted on the external deckle and having an exteriorly threaded length configured to threadingly engage an interiorly threaded bore defined by the carrier (or defined by a body mounted to the carrier). To unlock the external deckle, the illustrated connector 800 can be rotated (e.g., counterclockwise) until its exteriorly threaded end region moves out of the carrier's interiorly threaded bore, thereby freeing the external deckle to move transversely on its own, i.e., relative to the carrier.

As is perhaps best appreciated in FIGS. 3, 4, 12, 13, 17A, and 17B, one or both of the illustrated internal deckle members 20, 30 can be connected to the carrier 120 in such as way as to allow each of these deckle members 20, 30 to have its transverse position adjusted independently (e.g., relative to the deckle carrier, and relative to each other). For example, a threaded rod can extend between the deckle carrier 120 and the distal end of an internal deckle 20, 30, such that rotation of the rod moves the internal deckle 20, 30 transversely relative to the deckle carrier. As another alternative, a transversely slotted arm can be attached to a distal end of an internal deckle 20, 30, and a pin or another male body extending from the deckle carrier can be slidably received in the beam's slot, with a clamp or the like used to lock the slotted beam against the deckle carrier. Another option is a deckle adjustment like those system shown in FIGS. 12, 13, 17A, 17B, and 18A-C (described below). Yet another option is a deckle adjustment like those system shown in FIGS. 19A-C (also described below). Many other variants can be used as well. Moreover, it is not strictly required that the present deckle system 10 have any adjustability of this nature, although it may be preferred.

Thus, the illustrated base 50 comprises an elongated body that, when in a retracted cleaning position (e.g., when moved to a distal position relative to the die), bounds a cleaning access 57. As noted above, the cleaning access 57 provides a passage through which a scraper SC can be inserted to initiate cleaning of the die, e.g., a transition zone thereof. When the illustrated deckle system 10 is operatively assembled on the die D and the retractable base 50 is in its cleaning position, the cleaning access 57 is in communication with (e.g., via slit opening SLT or another opening passing through the end plate 80) the die's orifice, final land channel, and transition zone. Thus, an operator can simply slide the retractable base 50 away from the die D (e.g., after unlocking the base 50 from the deckle carrier 120) until the base reaches its retracted cleaning position, and then the operator can move a scraper SC (e.g., in an upstream direction) through the cleaning access 57 and then transversely into the die's orifice, final land channel, and transition zone. This is perhaps best appreciated by referring to FIG. 8. By then moving the scraper SC along the length of the die (e.g., in a back and forth motion, if necessary), the die's transition zone can be easily cleaned. Reference is made to FIGS. 9-11. In contrast to certain prior deckle assemblies, this cleaning can be performed without first having to take apart the external deckle, the die, or both.

Preferably, the base 50 is in its cleaning position when it is fully retracted transversely away from the die's orifice. Thus, an operator can slide the base 50 away from the die (this can be done manually after unlocking the external deckle from the deckle carrier) until there is enough clearance for the scraper SC to be inserted through the cleaning access 57.

The illustrated external deckle is a generally boat-shaped external deckle. This is perhaps best appreciated with reference to FIGS. 5-6B. Here, the external deckle comprises a base 50 having a first end region (e.g., a "die side" end region) 51. Two projection bars 58 extend from this end region 51 of the base 50 and terminate respectively at two leading ends LND. Preferably, the projection bars 58 are at least generally parallel to each other (and to a transverse length of the die's orifice). In the illustrated design, when the base 50 is in its retracted cleaning position, the two projection bars 58 bound the cleaning access 57. This is perhaps best seen in FIG. 8. Here, the cleaning access 57 is bounded collectively by the base's first end region 51 and its two projection bars 58. This particular configuration, however, is not required in all embodiments, although these projection bar/cleaning access features can be provided in any embodiment of the present disclosure (as can be seen in the figures).

As noted above, the illustrated deckle system 10 has an end plate 80 configured to be mounted on a side of a die D, and this end plate 80 defines two transverse mount openings OP in which are slidably mounted two side flanges 52 of the retractable base 50. While this exemplary arrangement has been found to provide excellent results, the present embodiments extend to any external deckle having a cleaning access that is spaced transversely away from the die (and/or is distal from a die-side end plate 80 of the deckle system 10).

In the embodiment of FIGS. 8-10, the cleaning access 57 is located on a distal side (i.e., the side remote from the die) of the deckle system's die-side end plate 80. Here, the cleaning access 57 is located at a transverse position between the die-side end plate 80 and the deckle carrier 120. More specifically, the illustrated cleaning access 57 is located on a distal side of the die-side end plate 80, but adjacent to that end plate. These details, however, need not be present in all embodiments.

In certain preferred embodiments, the deckle system 10 includes an internal deckle rod 40. For example, the system 10 can include a deckle rod 40 adapted (e.g., configured) to move transversely out of the die's transition zone in response to movement of the retractable base 50 to its retracted cleaning position. As seen in FIGS. 1, 5, 6A, 6B, 7-10, 17B, 18B, and 19B, some embodiments provide the retractable base 50 with an opening 43 in which the deckle rod 40 is configured to be mounted. In these embodiments, when the base 50 is moved transversely away from the die D (and/or away from an end plate 80 of the deckle system 10), the deckle rod 40 moves together with the base, such that the deckle rod moves out of the die's transition zone. This simultaneously 1) moves the base 50 to a configuration in which the cleaning access 57 is exposed for use, and 2) moves the deckle rod 40 out of the die D. At this point, the deckle system is ready to be cleaned.

Figure 12:
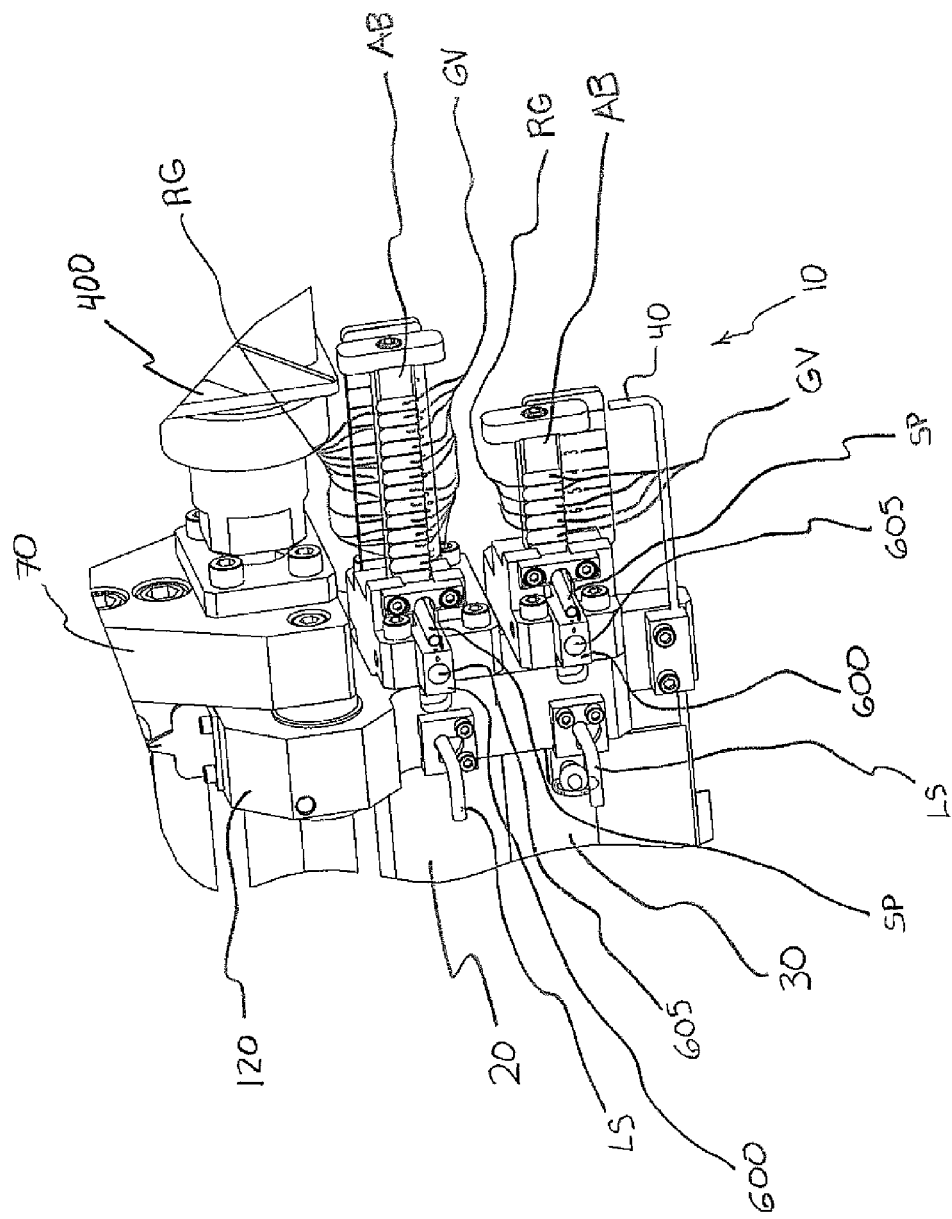
FIG. 12 is a partially broken-away front perspective view of a deckle system in accordance with certain embodiments of the invention.
Figure 13:
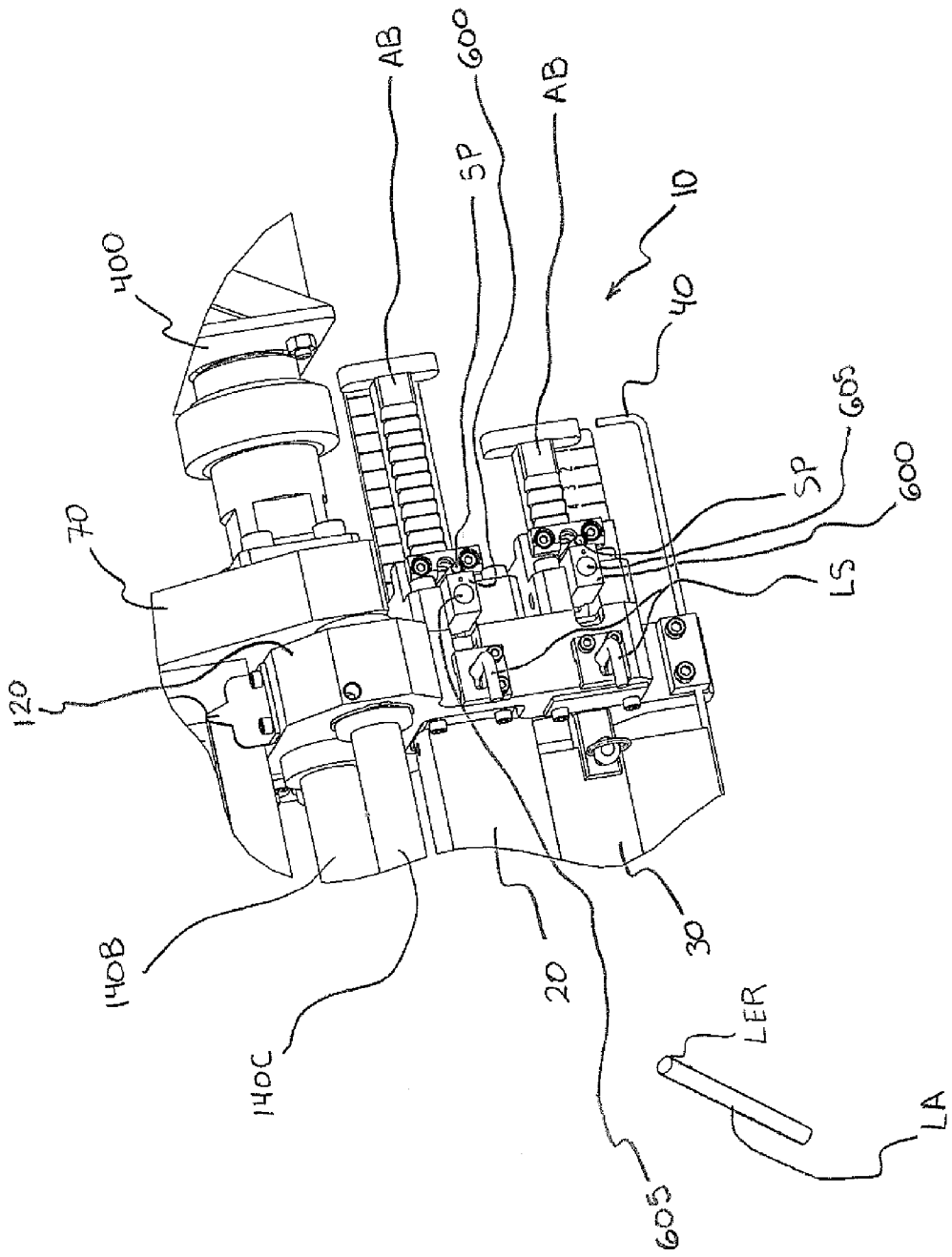
FIG. 13 is a partially broken-away front perspective view of the deckle system of FIG. 12, shown from another front perspective.

In other embodiments, a deckle rod is provided and is retractable from the die to facilitate cleaning, but the rod is held by (e.g., mounted to) another part of the deckle system. Reference is made to FIGS. 12 and 13. Here, the deckle rod is mounted in an opening defined by a lower region, or extension, of the deckle carrier 120. Other variants of this nature are possible as well.

As is perhaps best appreciated with reference to the embodiments of FIGS. 7-11, a deckle quill 20 preferably is disposed at least partially in the die's manifold. Additionally or alternatively, a secondary deckle flag 30 can optionally be disposed in the die's preland channel. In certain preferred embodiments, the deckle system includes a quill 20, a secondary flag 30, and a deckle rod 40, and the deckle quill 20 is a full-length quill, the secondary flag 30 is a full-length flag, and the deckle rod 40 is a full-length rod. This, however, is not required.

Thus, certain embodiments of the invention provide a die D equipped with (e.g., in combination with) a deckle system 10 of the nature described above. Reference is made to FIGS. 7-11. The invention, of course, also extends to the deckle system 10 itself (whether or not it is provided in combination with a die). Reference is made to FIGS. 1 and 2.

In some embodiments, the invention provides a deckle system that includes an external deckle and a die-side end plate. When provided, the die-side end plate 80 preferably is configured (or "adapted") to be mounted on an end of a die D. As noted above, the external deckle preferably comprises a retractable base 50 that is moveable transversely relative to the end plate 80, such that the base can be moved transversely away from this end plate to expose a cleaning access 57 into which a scraper SC can be inserted. In the illustrated embodiments, a slot opening SLT passes transversely through the end plate 80 and opens to the cleaning access 57, such that an access path for the scraper SC extends through the cleaning access and transversely along the slot opening. When the base is in its cleaning position, the cleaning access 57 is located between the die-side end plate 80 and a first end region 51 of the base 50. As noted above, in certain embodiments, projecting from the first end region 51 of the base 50 are two projection bars 58 that are at least generally parallel to each other, such that when the base is in its retracted cleaning position, the two projection bars bound the cleaning access 57. The illustrated die-side end plate 80 has already been described in connection with the combination die/deckle embodiments, as have other details that need not be repeated here.

The invention also provides methods of cleaning an extrusion die D. The die will commonly have a manifold, a preland channel, a final land channel, and an orifice. A transition zone (optionally of the type described above) will commonly extend from a downstream end region of the preland channel to an upstream end region of the final land channel. As noted above, however, the particulars of the die are not limiting to the invention. In some of the present methods, the die D is equipped with a deckle system 10 that includes an external deckle comprising a retractable base 50 mounted so as to be moveable transversely relative to the die, such that the base can be moved transversely away from the orifice far enough to expose a cleaning access 57, which is spaced transversely away from the die. In such cases, the method may comprise moving the retractable base 50 transversely (optionally after unlocking the base from a deckle carrier 120 of the system, e.g., such that the transverse movement of the base is relative to the carrier) so as to expose the cleaning access 57. In other cases, the deckle system may have no such retractable base, yet a cleaning access 57 located transversely away from the die D is provided. The method involves inserting a scraper SC into the cleaning access 57 (optionally by moving the scraper in an upstream direction) and moving the scraper transversely along the die D to clean unwanted material from the die, e.g., from a transition zone thereof. Preferably, when the scraper is moved along the die, this involves: i) a blade portion BL of the scraper moving transversely through the die's final land channel, and ii) a tip portion TP of the scraper moving transversely through the die's transition zone. This is perhaps best appreciated by referring first to FIGS. 8-10 and then to FIG. 11.

As noted above, the deckle system 10 can advantageously include an end plate 80 mounted to an end of the die D. Preferably, a slot opening SLT (or another type of opening) passing transversely through the end plate 80 opens to the cleaning access 57. In such cases, the method involves inserting the scraper SC into the cleaning access 57 followed by moving the scraper transversely through the slot opening SLT (or other opening) and into the die's transition zone and final land channel. As can be appreciated with reference to FIGS. 8-11, this involves moving the scraper from a position external to the die to a position within the die. In some of the present embodiments, the method involves moving a retractable base 50 transversely away from the die's orifice (optionally after unlocking the base from a deckle carrier of the system, e.g., such that the base moves transversely relative to the carrier, which may be stationary during such movement of the base), so as to expose the cleaning access 57, without first disassembling the deckle system 10 or the die D.

The invention provides a second group of embodiments wherein an extrusion die is equipped with an external deckle. Here again, the particular die used is not limiting to the invention. Briefly, though, the die will typically have a manifold, preland channel, final land channel, and an orifice. In the present group of embodiments, the external deckle has (e.g., carries) a land blade 60 that projects from outside of the orifice, through the orifice, and into the final land channel.

Figure 14:
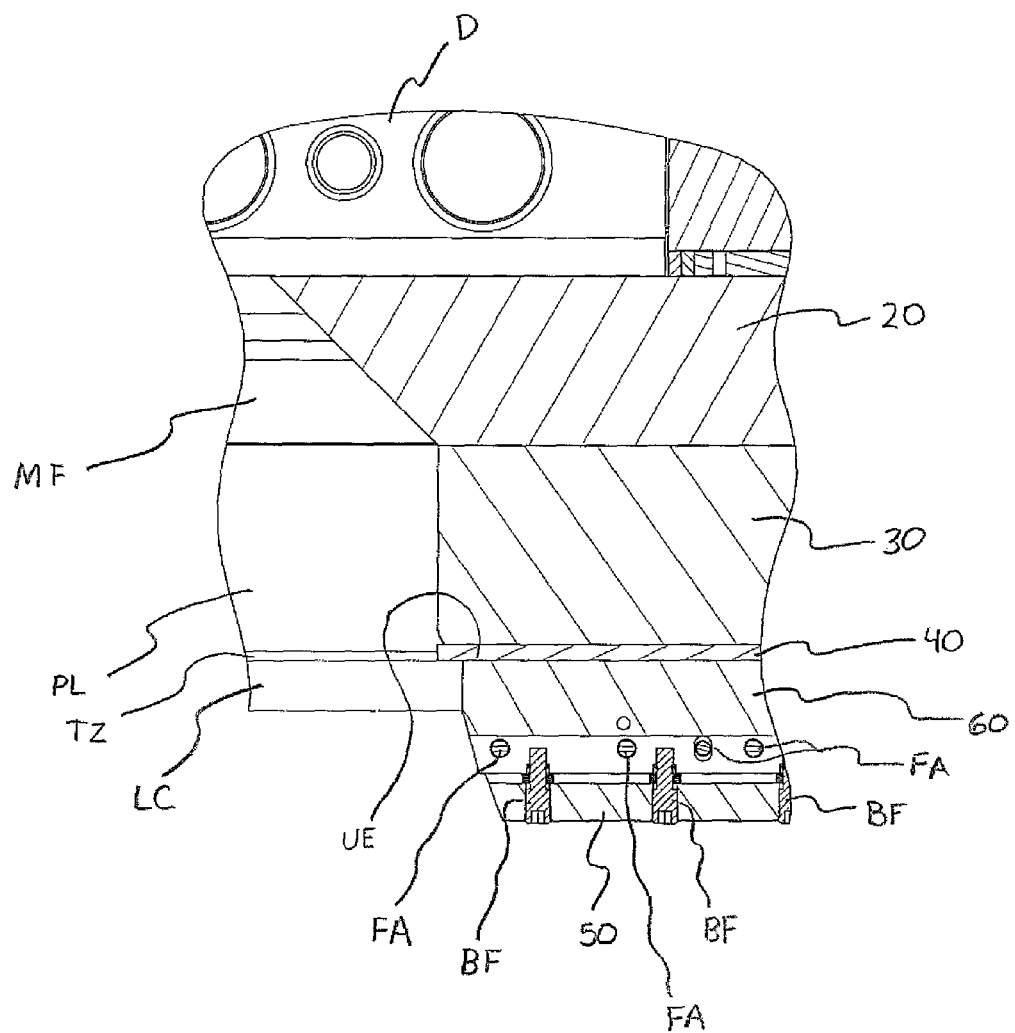
FIG. 14 is a cross-sectional view of a die having a final land channel into which extends a blade projecting from an external deckle in accordance with certain embodiments of the invention.

Reference is made to FIG. 14, which is a cross-sectional view of a die D having a final land channel LC into which extends a blade 60 projecting from an external deckle. Preferably, the land blade 60 does not extend (at least not substantially) into the preland channel PL, but rather has a leading edge (i.e., an upstream edge) UE that terminates in the final land channel LC (e.g., at a location where the preland channel, or a transition zone TZ, ends and the final land channel begins). Here, the illustrated land blade 60 occupies the entire length (as measured in the machine direction), or at least substantially the entire length, of the final land channel LC. Thus, the illustrated blade 60, when operatively positioned for extrusion, extends from the external deckle (e.g., from base 50) to a deckle rod 40 located in the die's transition zone TZ. The upstream edge UE of the illustrated land blade 60 is adjacent to (and may be in contact with) the deckle rod 40. This, however, need not always be the case.

In the embodiment of FIG. 14, a deckle quill 20 is disposed in the die's manifold MF, a secondary flag 30 is disposed in the die's preland channel PL, a deckle rod 40 is disposed in the die's transition zone, and the land blade 60 is disposed in the die's final land channel LC. This particular die and deckle arrangement is merely exemplary. As noted above, the particulars of the die can be varied to suit different applications, and the number and type of deckle members will likewise vary. Thus, the present embodiments extend to any die D having a final land channel LC into which extends a blade 60 projecting from (and optionally being mounted on) an external deckle.

In the present embodiments, the external deckle preferably comprises a retractable base 50 mounted so as to be moveable transversely relative to the die D. The retractable base 50 can be of the type described above in connection with the first group of embodiments (the base can be elongated in a direction parallel to a transverse length of the die's orifice, etc.). However, this is not required. Rather, the land blade 60 of the present embodiment group can be incorporated beneficially into many different external deckle systems.

Preferably, the land blade 60 is mounted removably on the external deckle, e.g., such that the blade and the external deckle are adapted to move together along the transverse axis. As is best seen in FIGS. 5 and 6A, the land blade 60 can advantageously be held (e.g., mounted removably) between two blade holders 90A, 90B. In the embodiment illustrated, the blade holders 90A, 90B collectively form a seal bar and are mounted on the retractable base 50 (e.g., within a concave interior region bounded by the base). The illustrated blade holders 90A, 90B are elongated bars defining between them a slot in which the blade 60 can be mounted removably. As can be appreciated by referring to FIGS. 4, 5, 6A, 6B, and 16C, a plurality of fasteners FA, BF can be extended through the bottom and/or side wall of the base 50 to secure the blade holders 90A, 90B on the base, optionally in a removable manner, and/or to facilitate adjusting the position of the seal bar. If desired, the blade holders can alternatively be fastened to the base permanently, or the blade can be removably mounted directly to the base. As is best appreciated with reference to FIG. 16C, fasteners BF can facilitate seal bar adjustment.

The blade 60 will commonly be very thin. Typically, the blade thickness will substantially match the thickness of the final land channel into which the blade is to project. By sandwiching the blade 60 between two holders 90A, 90B (which preferably are rigid, e.g., comprising metal), additional support and strength can be provided to the thin blade 60. Preferably, each holder defines a shoulder that bears against the blade and has a height that is at least 25% of the blade's height (or perhaps more preferably, at least 30%, at least 35%, or even at least 40%). This is perhaps best seen in FIG. 6A.

In preferred embodiments, the blade 60 is simply an elongated strip of metal having the desired thickness, height, and transverse length. In such cases, readily available shim stock can be used for the land blade. Suitable shim stock can be purchased from a variety of commercial suppliers. Therefore, if the blade 60 needs to be replaced, the operator will likely have no problem replacing it; suitable shim stock will generally be available from a variety of local sources.

Thus, in some embodiments, the blade 60 is a strip (e.g., of metal) having an elongated transverse length and a cross section that is a simple rectangle along the entire transverse length of the strip. Reference is made to FIG. 6B.

In the embodiment illustrated, the land blade 60 (as well as blade holders 90A, 90B) do not extend entirely along the transverse length of the external deckle body.

Rather, the illustrated blade 60 has a transverse length that is less than 80% that of the external deckle base 50. If desired, the blade's transverse length can be less than 75%, less than 70%, or even less than 65% that of the retractable base 50. This, however, is not required.

In certain embodiments, the land blade 60 is a full-length blade. Thus, when it is operatively positioned so as to extend into the die's final land channel, a distal length of the blade 60 extends transversely outside of the die. This, however, need not always be the case.

As noted above, the external deckle can advantageously be part of a deckle system 10 having an end plate 80 mounted to an end of the die D. In some embodiments of this nature, the end plate 80 bounds (e.g., defines) at least part of a slot opening SLT in which the blade 60 is received (e.g., slidably) when the external deckle is in use on the die (e.g., during extrusion). This is best appreciated by referring to FIGS. 1 and 2.

As discussed above in connection with the first group of embodiments, the external deckle can advantageously be a generally boat-shaped external deckle. Additionally or alternatively, the retractable base 50 can have a first end region 51 from which project two bars 58 that are at least generally parallel to each other (and to the die's orifice). In the illustrated embodiments, the deckle system 10 has an end plate 80 that defines two transverse mount openings OP in which two side flanges 52 of the base 50 are slidably mounted. As noted above, a deckle carrier 120 can advantageously define two other transverse mount openings OP in which the two side flanges 52 are slidably mounted. It is to be appreciated, however, that these details merely reflect certain preferred embodiments; the invention is not limited to always having these features FIG. 16A depicts the leading end region of an external deckle that has a particularly advantageous configuration. Here, ramps RMP are provided on the external deckle such that when the external deckle is retracted, the ramps release pressure between the die lip face LFSS and the seal bars 90A, 90B (see FIG. 16C). This configuration makes it possible to return the external deckle to its operating position without having to manually adjust the seal bar pressure. An external deckle of this nature (e.g., having the noted functionality, ramps, etc.) can optionally be provided in any embodiment, or any embodiment group, described herein.

In some of the present embodiments, an internal deckle rod 40 (optionally having a round cross section, being formed of metal, or both) is configured such that it moves transversely out of the die's transition zone in response to movement of the retractable base 50 away from the die (e.g., to a retracted cleaning position). As shown in FIGS. 1, 5, 6A, 6B, 7-10, 17A, and 17B, certain embodiments provide the retractable base 50 with an opening 43 in which the internal deckle rod 40 can be mounted. In these embodiments, when the base 50 is moved transversely away from the die, the deckle rod 40 moves together with the base such that the rod moves out of the die's transition zone. This can simultaneously 1) move the base 50 into a configuration in which a cleaning access 57 is operatively positioned/exposed, and 2) move the deckle rod 40 out of the die.

When a deckle rod 40 is provided, the deckle system 10 preferably includes means for locking the rod against unintended transverse movement away from the die. As shown in FIG. 1, a lock LK for the deckle rod 40 can be carried by the external deckle (e.g., on the retractable base 50). The lock LK can be, as just one example, a rotatable key, pin, shaft, or set screw that is externally threaded and mounted in a corresponding internally threaded bore extending generally perpendicular to the long axis of the deckle rod 40. In such cases, with the lock LK in an unlocked state (so that the deckle rod 40 is free to move transversely), the rod's transverse position can be adjusted. Then, the lock LK can be rotated such that its leading end bears forcibly against the deckle rod 40, thereby preventing the rod from being pushed outwardly by fluid pressure of extrudate passing through the die.

In the present embodiments, a quill 20 preferably is disposed in the die's manifold MF. Additionally or alternatively, a secondary flag 30 can optionally be disposed in the die's preland channel PL. In certain embodiments involving a quill, flag, and deckle rod, the rod 40 is a full-length rod, the quill 20 is a full-length quill, and the flag 30 is a full-length flag. Further, the land blade 60 can be a full-length blade. This, however, is by no means required.

Thus, certain embodiments of the invention provide a die D equipped with a deckle system 10 of the nature described above. Reference is made to FIGS. 7-10. The invention, however, also extends to the deckle system 10 itself (whether or not provided in combination with a die). Reference is made to FIGS. 1 and 2.

In certain embodiments, the invention provides a deckle system that includes an external deckle comprising a transversely moveable base 50, where a blade 60 projects from the base and is configured to extend through an orifice, and into a final land channel, of a die D to which the deckle system can be mounted. Preferably, the blade 60 is configured such that (when the deckle system is mounted operatively on the die) it does not to extend into (at least not substantially into) a preland channel of the die, but rather has an upstream edge that terminates in the final land channel (and/or is located as described above). In the present embodiments, the blade 60 is mounted (or is adapted for being mounted) removably on the retractable base 50. In some cases, the external deckle has two blade holders 90A, 90B comprising two elongated bars defining between them a slot in which the blade 60 is mounted removably. This is best seen in FIGS. 6A and 6B. As noted above, the blade 60 can optionally be a strip of metal having an elongated transverse length and a cross section that is a simple rectangle along the entire transverse length of the strip.

A third group of embodiments provides a deckle system having a novel deckle adjustment mechanism. The present group of embodiments also extends to combination embodiments where the deckle system is provided in combination with (e.g., is mounted operatively on) a die. Methods of using the present deckle system (e.g., so as to adjust the transverse position of an internal deckle member that is part of the deckle assembly) are also provided.

Reference is made to FIGS. 12, 13, 16B, 17A, 17B, 18A, 18B, and 18C. Here, the illustrated deckle adjustment mechanism includes an adjustment beam AB having a series of detent recesses GV spaced along a transverse length of the beam. The illustrated deckle adjustment mechanism includes a lever device (or "jack device") 600 operably coupled with an engagement tooth TTH (as one example, see FIG. 16B). In this design, by engaging the tooth TTH with a desired one of the detent recesses GV and pivoting the lever device 600 in a first direction (to the right as seen in FIGS. 12, 13, 16B, 17A, 17B, 18A, 18B, and 18C), the adjustment beam AB can be moved in a transverse inward direction, i.e., transversely toward a die position (to the left as seen in these figures).

In certain embodiments, an internal deckle member 20, 30 is operably coupled to the adjustment beam AB, such that in response to transverse movement of the beam, the internal deckle member moves transversely. Thus, when an internal deckle member 20, 30 is operably coupled with (e.g., attached rigidly to an end region of) the adjustment beam AB, the transverse position of the deckle member can be adjusted by moving the beam transversely. As is perhaps best appreciated by referring to FIGS. 13 and 16B, the distal end of the internal deckle member can be attached, directly or indirectly, to the adjustment beam. These attachment features can optionally be used in any embodiment of the present disclosure involving an adjustment beam (e.g., each adjustment beam AB in a given embodiment can optionally be attached to an internal deckle member 20, 30 in the manner described in this paragraph).

In the embodiment of FIGS. 12, 13, 17A, 17B, 18A, 18B, and 18C, the deckle system 10 includes two adjustment beams AB. However, this need not always be the case. For example, depending on the nature of the die and the desired extrusion process, there may be only one adjustment beam. Further, if three or more internal deckles were used, then there could be three or more adjustment beams.

In the present embodiments, the adjustment beam AB has a series of detent recesses (grooves, blind holes, or other female detents) GV spaced along a transverse length of the beam. In the illustrated designs, each recess GV is a groove elongated in a direction perpendicular to a transverse axis of the deckle system (e.g., perpendicular to the long axis of the beam AB). Preferably, between each two adjacent recesses GV there is a ridge RG. In the illustrated embodiment, each ridge RG has a generally triangular cross-sectional configuration, although this is not required.

The illustrated ridges RG each have a die-side face (i.e., a face oriented generally toward the die position) and a distal-side face (i.e., a face oriented generally away from the die position). The distal-side faces can advantageously be inclined at steeper angles (optionally at about 90 degree angles, relative to the transverse axis) than the die-side faces. This is best seen in FIGS. 13 and 16B. Angling the two faces of each ridge in this manner facilitates preventing outward transverse movement of the beam AB while simultaneously allowing transverse inward beam movement. More will be said of this later.

Preferably, the engagement tooth TTH is configured to be engaged with any desired one of the detent recesses GV. By so engaging the tooth TTH and pivoting the lever device (or "jack device") 600 in a first direction, the adjustment beam AB can be forced to move transversely. If desired, the engagement tooth could be adapted to simultaneously engage more than one detent recess.

To pivot the illustrated lever device 600, an end region LER of a lever LA (see FIG. 13) can be inserted into an opening 605 of the lever device, at which point the lever can be moved so as to pivot the lever device in the desired direction. Thus, by engaging the tooth TTH with a desired one of the detent recesses GV and pivoting the lever device 600 in a first direction (to the right as seen in FIGS. 12, 13, 16B, 17A, 17B, 18A, 18B, and 18C), the adjustment beam AB can be moved in a transverse inward direction (to the left as seen in these figures). After so pivoting the lever device 600 in the first direction, the lever device can be pivoted in an opposite, second direction so as to move the tooth TTH into engagement with a subsequent one of the detent recesses GR, at which point the lever device can be pivoted in the first direction again to move the adjustment beam AB further in the transverse inward direction. By repeating this series of steps (e.g., by pivoting the lever device back and forth as described), the adjustment beam can be moved inwardly in increments. The back-and-forth pivoting steps can be repeated as many times as necessary until the adjustment beam AB (and an internal deckle member 20, 30 attached thereto) has moved to its desired position. At that point, the properly positioned internal deckle member 20, 30 can be locked in place (e.g., relative to the deckle carrier 120), as described below.

The illustrated adjustment mechanism comprises a ratchet mechanism in that moving (e.g., pivoting) the lever device 600 in the first direction causes the adjustment beam AB to move transversely (e.g., inwardly) whereas moving the lever device in the opposite direction does not cause transverse movement of the beam (rather, the beam can remain stationary during pivoting of the lever device in the second direction).

In the present embodiment group, the deckle system preferably includes a locking mechanism LKM, LKM' (as one example, see FIG. 16B). When provided, the locking mechanism can be used to prevent outward transverse movement of the beam AB, which may otherwise occur due to fluid pressure of extrudate passing through the die pressing outwardly on an internal deckle coupled to the beam.

Figure 17B:
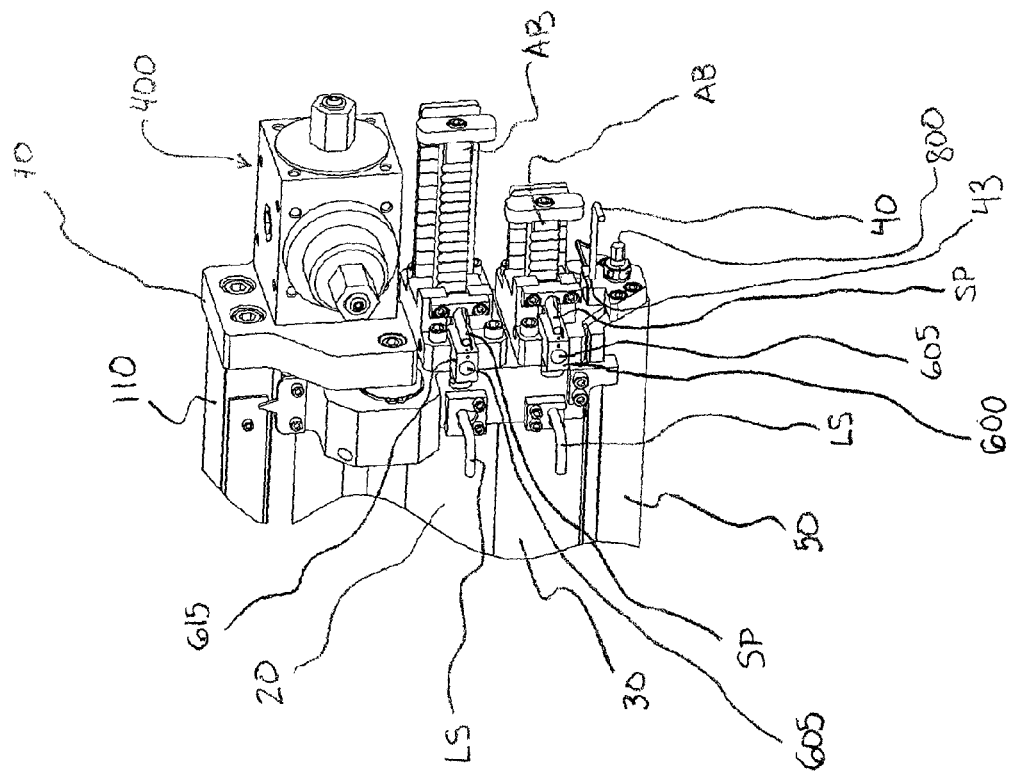
FIG. 17B is a partially broken-away front perspective view of the deckle system of FIG. 17A, shown from another front perspective and with the quill in place.
Figure 17A:
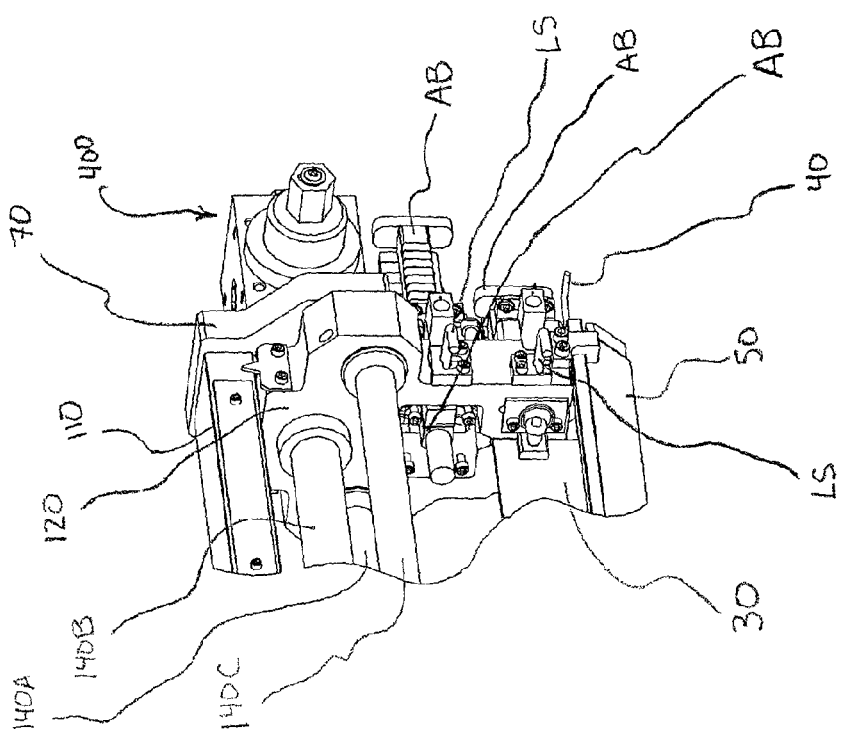
FIG. 17A is a partially broken-away front perspective view of a deckle system in accordance with certain embodiments of the invention, with a quill of the system removed for purposes of illustration.

In FIGS. 16B, 17A, and 17B, the illustrated locking mechanism LKM has a free configuration, an engaged configuration, and a locked configuration. This, however, is not always required. For example, the locking mechanism could alternatively just have locked and free configurations, or the locking mechanism could just have free and engaged configurations. Alternatively, the locking mechanism can have four different settings/configurations, as described below. Many variations of this nature will be apparent to skilled artisans given the present teaching as a guide.

The illustrated locking mechanism LKM, LKM' comprises an engagement body GRP (see FIG. 16B: not visible in FIGS. 18A-C) configured to bear against the adjustment beam AB, e.g., when the locking mechanism is in either an engaged configuration or a locked configuration. The illustrated engagement body GRP is spaced apart from the adjustment beam AB when the locking mechanism is in the free configuration. In the present design, the locking mechanism when in the free configuration allows the beam AB to move transversely in both inward and outward directions. In contrast, the locking mechanism when in an engaged (or "in") configuration allows the beam to move transversely in the inward direction but prevents the beam from moving transversely in the outward direction. Thus, the present locking mechanism serves as a ratchet in that, when in an engaged configuration, it only allows movement of the adjustment beam AB in one transverse direction (e.g., while preventing transverse movement in the opposite direction). The illustrated locking mechanism when in the locked configuration prevents the beam AB from moving transversely in either the inward or outward directions.

In the illustrated embodiments, the transverse movement allowed or prevented by the locking mechanism, which has just been described, is relative to the deckle carrier 120, which typically remains in a fixed transverse position while the lever device 600 is used to adjust the position of the beam AB. In alternate embodiments, there may be no movable deckle carrier, and the noted transverse movement of the beam may be relative to a stationary end plate (or the like) to which the adjustment beam(s) may be mounted.

The locking mechanism's engagement body can take a variety of different forms. The engagement body GRP shown in FIG. 16B has a plurality of teeth configured to engage one or more surfaces bounding the adjustment beam's detent recesses GV. The illustrated teeth have distal-side faces and die-side faces, with the die-side faces being at steeper angles than the distal-side faces. Here, the die-side faces of these teeth are configured to engage the distal-side faces of the ridges RG on the adjustment beam AB. Thus, when the locking mechanism is in an engaged or locked configuration, the resulting engagement involves confronting pairs of surfaces bearing against one another so as to prevent outward movement of the adjustment beam (relative to the deckle carrier 120). The distal-side faces of these teeth are configured to engage the die-side faces of the ridges RG on the adjustment beam AB. Due to the moderate angles of these faces, when the locking mechanism is in an engaged configuration, applying a sufficient transverse inward force to the adjustment beam AB results in the beam moving inwardly. In the process, the angled die-side faces of the beam's ridges RG cam with the corresponding distal-side faces of the engagement body's teeth, thereby allowing the engagement body GRP to ride over the ridges RG as the beam AB is forced to move inwardly. These details, however, are not limiting; the engagement body can take many other forms.

Figures 18A, 18B, 18C:
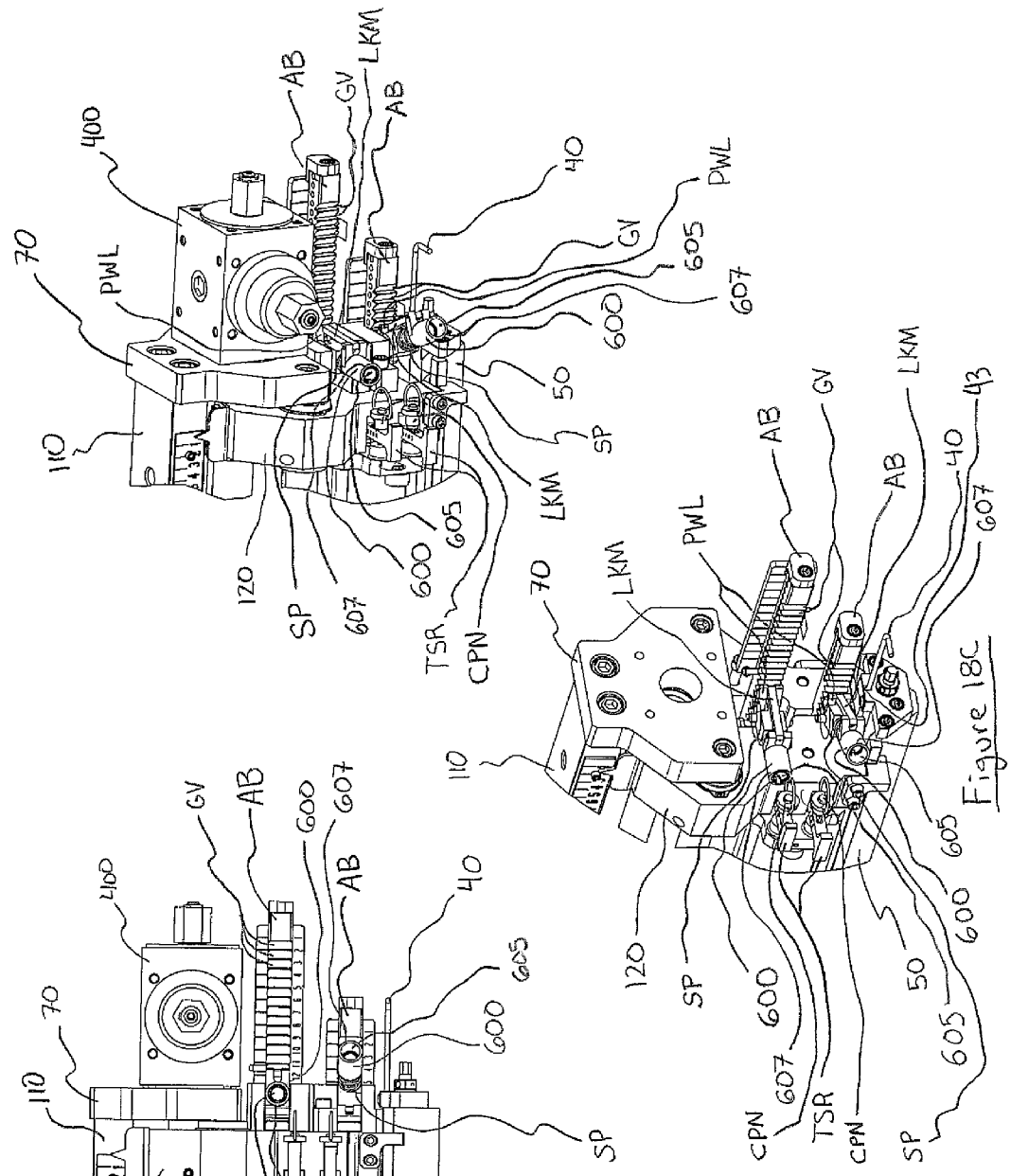
FIG. 18A is a partially broken-away front elevation view of another deckle system in accordance with certain embodiments of the invention.
FIG. 18B is a front perspective view of the deckle system of FIG. 18A.
FIG. 18C is another front perspective view of the deckle system of FIG. 18A, with the gear box removed for purposes of illustration.

In the locking mechanism of FIGS. 16B, 17A, 17B, and 18A-C, the engagement tooth TTH is defined by a pivotable pawl PWL that is operably coupled with a spring member SP. Here, the spring member SP is configured to bias the pawl PWL such that when the tooth moves transversely into alignment with one of the detent recesses GR, the spring member can forces the tooth to move into (thereby engaging) that recess. In FIGS. 16B, 17A, and 17B, the spring member SP is attached at one end to the lever device 600 and at the other end to the pivotable pawl PWL. In FIGS. 18A-C, the spring member SP is mounted on the lever device 600 in a different manner, as will now be described.

The lever (or "jack") device 600 in FIGS. 18A-C has an end sleeve 607 that can be moved axially so as to compress the spring member SP. This can be done (when the lever is inserted into the lever device's opening 605) by pushing the lever axially (toward the adjustment beam AB) such that the sleeve 607 compresses the spring member SP. This can be done to facilitate moving the internal deckle member 20, 30 transversely outwardly (e.g., away from the die position). In more detail, the lock mechanism LKM' can be put in an "out" configuration (which when selected allows outward movement of the corresponding internal deckle member), and the lever can be advanced so as to depress the spring member SP, which causes the pawl PWL to pivot so as to move the engagement tooth TTH out of engagement with the adjustment beam AB. This technique can be used to back-out the adjustment beam (and the corresponding internal deckle member) in a controlled fashion, e.g., one groove at a time if desired.

The lock mechanism LKM' in FIGS. 18A-C is different from that of FIG. 16B in that it has four configurations/settings, which are referred to herein as "in," "out," "locked," and "unlocked" configurations. When in the locked configuration, the engagement body GRP bears against the adjustment beam AB so as to prevent movement of the adjustment beam (and the corresponding internal deckle member) in either transverse direction. When in the free configuration, the engagement body GRP is spaced apart from the adjustment beam AB such that the adjustment beam and the corresponding internal deckle member are free to move in either transverse direction. When it is desired to move the adjustment beam and the corresponding internal deckle member outwardly, the lock mechanism LKM' is placed in the "out" configuration, at which point pressure from extrudate can move the corresponding internal deckle member outwardly, during which process the lever (or "jack") device 600 can be used to control the outward movement of the deckle, as described above. When it is desired to move the adjustment beam and the corresponding internal deckle member inwardly, the lock mechanism LKM' is set to the "in" configuration, and the lever device 600 is used to move the corresponding deckle member inwardly, as described above with reference to FIGS. 16B, 17A, and 17B. In FIGS. 18A-C, the lock mechanism LKM' comprises a generally T-shaped rod TSR having a cross-pin CPN adapted to lock the T-shaped rod in any of four configurations, i.e., the above-noted "in," "out," "locked," and "free" configurations.

The illustrated lever device 600 is pivotable about a first axis (defined by a first pivot point PP1). The pawl PWL is also mounted pivotally (e.g., on the lever device) and is pivotable about a second axis (defined by a second pivot point PP2). In the illustrated designs, these first and second axes are parallel to each other (or at least substantially parallel), although this is by no means required.

In FIGS. 16B, 17A, and 17B, the illustrated locking mechanism LKM includes a control body LS that is operable to move the locking mechanism selectively into its desired configuration (e.g., into its engaged, locked, or free configuration). The control body LS is shown in the form of a rod, although many other structures can be used. The handle portion of the illustrated rod is shown with the locking mechanism in the engaged configuration. In this configuration, the rod bears against a locking plate LPT, which holds the engagement body GRP against the adjustment beam AB. In the engaged configuration, the engagement body GRP allows the beam AB to move transversely in the inward direction, but not in the outward direction, as already described. By moving the handle portion of the illustrated rod so that it points upward, the locking mechanism is moved to its locked configuration, which holds the engagement body GRP rigidly against the adjustment beam AB, such that the beam is not able to move transversely in either direction. By moving the handle portion of the illustrated rod so that it points downward, the locking mechanism is moved to its free configuration, which preferably involves the engagement body GRP being spaced apart from the adjustment beam AB, such that the beam is free to move transversely in either direction.

In the present group of embodiments, the deckle system 10 preferably has a movable deckle carrier 120. In such cases, the deckle system preferably includes one or more transverse beams 140A-140C along which the carrier 120 is moveable transversely. This is perhaps best seen in FIGS. 13 and 17A. Here, two adjustment beams AB are mounted on the moveable carrier 120. Preferably, the locking mechanism LKM, LKM' is put in its locked configuration when it is desired to move the carrier 120 transversely. By then moving the carrier 120 transversely, the adjustment beam(s) AB, the internal deckle member(s) 20, 30, and the external deckle 50 can be made to move transversely together with the carrier.

As noted above, the present deckle system can be provided in combination with a die D (e.g., such that the deckle system is mounted operatively on the die). In embodiments like those exemplified in FIGS. 12, 13, 17A, 17B, and 18A-C, the deckle system 10 includes two adjustment beams AB and two internal deckle members 20, 30. A first 20 of the internal deckle members is operably coupled to a first of the two adjustment beams AB, such that in response to transverse movement of the first adjustment beam, the first internal deckle member 20 moves transversely. Likewise, a second 30 of the internal deckle members is operably coupled to a second of the two adjustment beams AB, such that in response to transverse movement of the second adjustment beam, the second internal deckle member 30 moves transversely. Thus, each internal deckle member 20, 30 can be transversely positioned independently of the other (and relative to the deckle carrier). Each adjustment beam AB preferably has a series of detent recesses GR spaced along a transverse length of the beam, as has been described. Similarly, these embodiments preferably include two locking mechanisms LKM, LKM', two lever devices 600, two engagement teeth TTH, etc. In such embodiments, the adjustment beams AB, locking mechanisms LKM, LKM', lever devices 600, and engagement teeth TTH preferably are mounted on a movable carrier 120 of the deckle system 10, as has also been described.

The present embodiment group also provides methods for adjusting deckle position on a die D equipped with a deckle system 10. In the present methods, the deckle system 10 includes a deckle adjustment mechanism comprising an adjustment beam AB having a series of detent recesses GV spaced along a transverse length of the beam. An internal deckle member 20, 30 is operably coupled to the adjustment beam AB. Preferably, the deckle system 10 includes a lever device 600 operably coupled with an engagement tooth TTH (as described above), and the method involves engaging the tooth in one of the detent recesses GV and pivoting the lever device so as to bias the adjustment beam AB and thereby move it transversely (e.g., in the inward direction). This causes the internal deckle member to move transversely (i.e., together with the adjustment beam), preferably relative to a deckle carrier, which will typically remain in a fixed transverse position during such adjustment.

As can be appreciated by referring to FIGS. 12, 13, 16B, 17A, 17B, and 18A-C, the present method may involving pivoting the lever device 600 so as to provide the noted biasing and the resulting transverse movement of the adjustment beam AB. For example, an operator may insert the leading end region LER of a lever LA (see FIG. 13) into the lever device 600 and then move the lever to the right (as seen in these particular figures), thereby pivoting the lever device, and in the process forcing the adjustment beam AB to move toward the die (to the left, as seen in these figures).

In some of the present methods, after pivoting the lever LA once in the first direction, the method involves pivoting the lever in a second, opposite direction so as to move the engagement tooth TTH into engagement with the next detent recess GV, whereafter the lever LA is again pivoted in the first direction, so as to move the beam AB further toward the die position. Thus, after a first pivoting step, the method may subsequently comprise: i) engaging the tooth TTH in another of the detent recesses GV, and ii) pivoting the lever device 600 so as to bias the beam and thereby further move the beam inwardly. This process can be repeated as many times as necessary to move the beam AB (and the internal deckle coupled to the beam) to whatever transverse position may be desired. The present method may thus involve a ratcheting operation in which the lever device 600 is pivoted back and forth repeatedly (e.g., while the locking mechanism LKM, LKM' is in an engaged or "in" configuration) until the internal deckle member 20, 30 reaches its desired position.

A fourth group of embodiments provides a novel internal deckle member 20 for use with extrusion dies. Reference is made to FIG. 15. The novel deckle member 20 (which can be referred to as a quill, plug, flag, or blade) comprises an elongated body 29 defining a transverse opening 217 that opens through a side end (e.g., a distal side end) SE of the body and extends inwardly into the body. This opening 217 can optionally be a blind opening that extends to a wall 230 defining a blind end of the opening. In the present embodiments, an internally threaded sleeve 225 is mounted in the opening 217 and defines an internally threaded passageway 228 for receipt of a correspondingly externally threaded shaft SH. The sleeve 225 is mounted removably within the opening 217 such that if internal threads 226 of the sleeve are damaged, then the sleeve can be removed and replaced with another internally threaded sleeve. This eliminates the wasteful practice of discarding the whole deckle member simply because its internal threading has been damaged.

Typically, the deckle's elongated body 29 will be formed of one of the metals that are commonly used for internal deckle members. The internal sleeve 225 can be formed of the same metal, although this is not required.

In some cases, the sleeve 225 has a generally cylindrical configuration. For example, the sleeve 225 can have a cylindrical exterior shape, and it can define a cylindrical interior opening. In other cases, the sleeve has a polygonal exterior shape, and it defines a cylindrical interior opening. Other variants of this nature will be apparent to skilled artisans given the present teaching as a guide.

FIG. 15 shows one example of an internal deckle member 20 having an internally threaded sleeve 225 in accordance with the present embodiments. Here, an exteriorly threaded shaft SH is shown, and it will be understood that certain embodiments provide the deckle member 20 in combination with such a shaft. For example, when operatively assembly, an externally threaded section 242 of the shaft SH is mounted in the deckle member's internally threaded passageway 228. The illustrated sleeve 225 has a cylindrical configuration with one closed end (at the blind end of the illustrated bore 217) and one open end (at the deckle body's side SE). Alternatively, the sleeve can be open at both ends.

When a die is equipped with a deckle member 20 of the present embodiments, the deckle member will in some cases be located (at least in part) within the die's manifold. In other cases, a deckle member having the internally threaded sleeve will be located (at least in part) in the preland channel. In some cases, the present deckle member 20 is operatively positioned in the die's manifold, while a second internal deckle member 30 is operatively positioned in the die's preland channel. In such cases, one or both of these internal deckle members 20, 30 can be provided with the present internally threaded sleeve feature. Further, a deckle rod 40 can optionally be positioned downstream of the second deckle member 30.

It is to be appreciated that a wide variety of deckle members will benefit from the provision of a removable internally threaded sleeve. Thus, the present sleeve feature can be incorporated into any type of deckle member.

In some of the present embodiments, the deckle member 20 is a full-length internal deckle. The term "full-length" is used herein to refer to a deckle member having a length in the transverse direction that exceeds (or is at least about equal to) the maximum transverse engagement of the deckle member within the die's flow passage (which typically includes a manifold, preland channel, and final land channel). The present deckle member 20, however, is not required to be a full-length deckle. For example, the internally threaded sleeve feature can be incorporated advantageously into a variety of non-full-length deckle members.

FIGS. 19A-19C show another deckle system in accordance with certain embodiments of the invention. This embodiment is particularly advantageous in that it has a deckle adjustment mechanism that provides particularly swift deckle adjustment. That is, when the deckle adjustment system is used to transversely move an internal deckle of the system, the internal deckle travels rapidly. (Referring to FIG. 19C, it will be appreciated by skilled artisans that the deckle system has a transverse axis, which in the figure can be understood to be parallel to the long dimension of the adjustment beams. Thus, transverse movement refers to movement along this axis.)

The deckle system preferably comprises at least one stationary beam 140A-140C and a movable deckle carrier 120 configured to move transversely along the stationary beam(s). Preferred beam 140A-140C and carrier 120 designs have been described in connection with other embodiments; the same features/details can be provided in the present embodiment, as seen in FIGS. 19A-19C. For example, there can be a plurality of such stationary beams 19A-19C, and at least one of them can advantageously be an externally threaded beam, as described above.

Thus, in the present embodiment, the deckle adjustment mechanism preferably is provided on (e.g., mounted on, or otherwise incorporated onto) the moveable deckle carrier 120. The present embodiment preferably also includes an external deckle 50 of the nature described above (e.g., having the cleaning access features/functionality and/or land blade 60 features described above), as can also be appreciated in FIGS. 19A-19C. Thus, the features and functionalities that are general/equally applicable to the various deckle adjustment systems described herein, as detailed elsewhere in the present disclosure, can be provided in the present embodiment (many such features are shown in FIGS. 19A-19C). These features and functionalities, however, are not described in detail here.

The present deckle adjustment mechanism includes an elongated adjustment beam AB comprising a rack RK with a series of teeth TTH spaced along a transverse length of the rack. The deckle adjustment mechanism has a pinion PN operably coupled with the rack RK, such that rotating the pinion in a first direction causes the adjustment beam to move in a transverse inward direction (e.g., toward the die position), whereas rotating the pinion in a second direction causes the adjustment beam to move in a transverse outward direction (e.g., away from the die position). The adjustment beam AB is configured (e.g., adapted) to be operably coupled to (in some cases, it is attached to) an internal deckle member (e.g., when the deckle system is mounted on the die, the adjustment beam is operably coupled to an internal deckle member), such that the internal deckle member is configured to move transversely together with the adjustment beam. In the present embodiment, when the pinion is rotated, the corresponding internal deckle member travels particularly rapidly, thereby making adjustment extremely convenient. More will be said of this later.

The present deckle adjustment mechanism comprises a control unit CU having a locked configuration, a first adjustment configuration, and a second adjustment configuration. When the control unit CU is in its locked configuration, the corresponding internal deckle member is locked against movement in either transverse direction. When the control unit is in its first adjustment configuration, the corresponding internal deckle member is locked against outward transverse movement but is free to move transversely inwardly in response to rotation of the pinion in the first direction. When the control unit is in its second adjustment configuration, the corresponding internal deckle is locked against inward transverse movement but is free to move transversely outwardly in response to rotation of the pinion in the second direction.

As shown in FIGS. 19A-19C, the control unit CU has a control CL that can be moved selectively into any of three positions so as to place the control unit selectively into the locked configuration, the first adjustment configuration, or the second adjustment configuration. Preferably, the control CL is an externally accessible, manually movable control body. In the illustrated embodiment, the control CL is a lever switch that can be moved into any of three positions. As is perhaps best seen in FIG. 19A, when the lever switch is moved to its central position, the control unit CU is in its locked configuration, and the corresponding internal deckle member is thus locked against movement in either transverse direction. When the lever switch is moved to the right (as seen in FIG. 19A, e.g., to the "IN" position), the control unit CU is in its first adjustment configuration, such that the corresponding internal deckle member is locked against outward transverse movement but is free to move transversely inwardly in response to rotation of the pinion in the first direction. When the lever switch is moved to the left (e.g., to the "OUT" position), the control unit CU is in its second adjustment configuration, and the corresponding internal deckle is locked against inward transverse movement but is free to move transversely outwardly in response to rotation of the pinion in the second direction. Preferably, a ratchet clutch is used. Useful commercially available ratchet clutches are available from the Lowell Corporation of West Boylston, Mass., U.S.A. (the Lowell Series 70 product is one suitable example).

In FIG. 19C, the deckle adjustment mechanism is shown with exterior housing HOS removed, so as to illustrate the inner workings of the rack and pinion system. Here, it can be seen that the illustrated embodiment comprises a control shaft PNS, and the pinion PN rotates with, or in response to rotation of, the control shaft. The illustrated control shaft PNS is integral to the pinion PN (i.e., the control shaft and pinion are formed by a single integral shaft). This, however, is by no means required. For example, the control shaft and the pinion can be separate bodies connected or otherwise operably coupled to each other.

As noted above, the present deckle adjustment mechanism system moves the corresponding internal deckle member at a particularly fast rate of travel. For example, the present system preferably is configured such that the internal deckle member moves transversely by at least 3 inches (more preferably at least 4 inches, and perhaps optimally at least 4.5 inches, such as about 5 inches or more) in response to a single 360 degree rotation of the control shaft PNS. In one exemplary embodiment, the pinion PN has an exterior diameter of about 1 inch with ten teeth spaced about the pinion's circumference. In this particular example, the internal deckle member moves transversely (i.e., linearly along the transverse axis) by about 5 inches in response to a single 360 degree rotation of the control shaft PNS. These details (the rate of travel per rotation, etc.) can be varied, of course, to suit the needs of different users and different applications.

In FIGS. 19A-19C, the control shaft PNS is provided with an externally accessible, rotatable control body HX, and rotation of this body rotates the control shaft (which rotates the corresponding pinion), thereby causing transverse movement of the rack RK and the corresponding internal deckle. In the embodiment illustrated, the control body HX comprises a hex-shaped member (e.g., a hex cap). This makes it possible for the operator to simply use a wrench, ratchet, drill, etc. to adjust the position of the corresponding internal deckle member. Many other control body configurations are possible, however.

In the present embodiment, the illustrated adjustment beam AB is elongated in a direction parallel to (or at least substantially parallel to) the transverse axis of the deckle system, and the illustrated control shaft PNS is elongated in a direction perpendicular to (or at least substantially perpendicular to) the transverse axis. In more detail, the illustrated control shaft PNS is mounted (on the moveable deckle carrier 120) so as to have its long axis perpendicular to (or at least substantially perpendicular to) both the transverse axis and the machine direction.

In the present embodiment, the deckle system is configured (e.g., adapted) to be mounted operatively to an extrusion die D, e.g., such that an internal deckle (or "quill") 20 of the deckle system is disposed at least partially within a manifold MF of the die. The deckle system of FIGS. 19A-19C can be mounted to the die D in the same manner as is shown in FIGS. 7-11 and 14. Thus, the present embodiment also extends to a combination wherein the present deckle system is provided in combination with (e.g., is mounted operatively on) a die. Methods of using the present deckle system (e.g., so as to adjust the transverse position of an internal deckle member that is part of the deckle assembly) are also provided.

In the illustrated embodiment, the deckle system includes two internal deckle members 20, 30 each having its own rack and pinion adjustment mechanism. Thus, the assembly includes a second internal deckle (or "secondary flag") 30 operably coupled with (e.g., attached to) a second adjustment beam AB. The second adjustment beam comprises a second rack RK having a series of teeth TTH spaced along a transverse length of the second rack. A second pinion PN is operably coupled with the second rack RK, such that rotating the second pinion in a first direction causes the second adjustment beam to move in a transverse inward direction, whereas rotating the second pinion in a second direction causes the second adjustment beam to move in a transverse outward direction. The second adjustment beam AB is operably coupled to the second internal deckle 30 such that the second internal deckle is configured to move transversely conjointly with the second adjustment beam.

Thus, in the system shown in FIGS. 19A-19C, there are two rack & pinion controlled internal deckle members 20, 30. Separate control units CU are provided so that each internal deckle member 20, 30 can be adjusted separated. For example, if an operator wishes to fine tune the transverse position of the quill 20 relative to the transverse position of the secondary flag 30, then control unit CU on the left (as seen in FIGS. 19A-19C) can be operated by rotating the control body HX on that unit CU in the appropriate direction until the quill 20 reaches its desired transverse position. Similarly, if the operator wishes to fine tune the transverse position of the secondary flag 30 relative to the transverse position of the quill 20, then control unit CU on the right (as seen in FIGS. 19A-19C) can be operated by rotating the control body HX on that unit CU in the appropriate direction until the flag 30 reaches its desired transverse position. Thus, the present deckle system can advantageously comprises two side-by-side control units CU of the nature described.

An extrusion die system can advantageously be provided with the features of one, two, or more of the embodiment groups described above.

The illustrated deckle system embodiments are advantageous in that they can be removed from an extrusion die in their entirety (i.e., as an assembly).

In some embodiments of the invention, a deckle rod 40 is disposed just downstream from a trailing edge (i.e., a downstream edge) of a secondary deckle flag 30. If desired, the deckle rod can be supported by a groove (e.g., a concave semi-circular groove) in the flag's trailing edge, giving it additional lateral support. While this feature is believed to be advantageous, it is by no means required.

Further, if desired, the external deckle, the end plate, or both can be air cooled to slow nuisance leaks. This is best appreciated by referring to FIGS. 6B and 7-10. Here, it can be seen that a cool air line 710 is configured to deliver cool air to the external deckle (preferably so as to cool the land blade 60). As shown, the cool air line 710 extending to the external deckle is attached to the retractable base 50. In some cases, cool air line 710 delivers cool air to one or both of the blade holders 90A, 90B. For example, a cool air path can pass through one or both of the illustrated blade holders 90A, 90B. In FIG. 6B, the illustrated blade holders 90A, 90B each define an air passage AC through which cooling air from air line 710 can be delivered. In the embodiment illustrated, cool air from line 710 flows through a channel AC in a first of the holders 90A, 90B, then through an opening AO in the blade 60, then through a channel AC in the second of the holders 90A, 90B, and finally out of the blade holder assembly through an outlet vent defined by one or both holders 90A, 90B. This is representative of a group of embodiments wherein an external deckle carries a land blade 60 that is air cooled, optionally by having at least one cool air channel in direct communication with the blade and/or by having the blade itself define an opening through which a cool air path flows. The invention extends to any deckle system (and to any die equipped with such a deckle system, and to any method of using such a deckle system) having an external deckle provided with an air cooled land blade.

Additionally or alternatively, the deckle system can be provided with a cool air line configured to deliver cool air to an end plate of the deckle system. Reference is made to FIGS. 7-10, wherein cool air line 705 is shown extending to end plate 80. Here, the cool air delivered to end plate 80 flows around the quill 20 and the secondary flag 30. This is representative of a group of embodiments wherein a deckle system has a cool air line 705 configured to deliver cool air flow adjacent to (around, directly against, etc.) at least one internal deckle member. The invention extends to any such deckle system (and to any die equipped with such a deckle system, and to any method of using such a deckle system), whether or not it includes the features described elsewhere in this disclosure.

Finally, the seal pressure for the external deckle can advantageously be preset using springs, so that the operator does not have to make any adjustments. Here again, this feature is optional.

While certain preferred embodiments have been described, it should be understood that various changes, adaptations and modifications may be made therein without departing from the spirit of the invention and the scope of the appended claims.

What is claimed is:

1. An extrusion die having a deckle system, manifold, a preland channel, a final land channel, and an orifice, said preland channel having a downstream end region, said final land channel having an upstream end region, a transition zone extends from said downstream end region of said preland channel to said upstream end region of said final land channel, said deckle system including an end plate mounted to said extrusion die and an external deckle having a retractable base, said retractable base mounted so as to be moveable transversely away from said orifice to expose a cleaning access defined by said deckle system, without having to disassemble said deckle system or said extrusion die, said cleaning access configured to receive a scraper for cleaning unwanted material from said transition zone, said cleaning access being spaced transversely away from said extrusion die and located transversely away from said end plate of said deckle system.

2. The extrusion die of claim 1 wherein said retractable base has a first end region adjacent to said extrusion die, and wherein, when said cleaning access is exposed by moving said retractable base transversely away from said orifice, said cleaning access is bounded by said first end region of said retractable base.

3. The extrusion die of claim 1 wherein said end plate has a slot opening passing transversely through said end plate, and wherein, when said retractable base is moved transversely away from said orifice to expose said cleaning access, said slot opening passing transversely through said end plate opens to said cleaning access, such that an access path for the scraper extends first through said cleaning access, then transversely along said slot opening, and into said transition zone and said final land channel.

4. The extrusion die of claim 3 wherein said slot opening passing transversely through said end plate opens to, and extends between, said cleaning access on one side and said transition zone and said final land channel on another side.

5. The extrusion die of claim 1 wherein said retractable base has a concave generally boat-shaped configuration having an end region with two projection bars that are at least generally parallel to each other and to said orifice.

6. The extrusion die of claim 5 further comprising an end, said end plate mounted to said end, said end plate has two openings, each of said two projection bars of said retractable base are received by a respective one of said openings.

7. The extrusion die of claim 1 wherein said deckle system includes an internal deckle member that is adjustable transversely and a movable carrier, said internal deckle member being mounted to said movable carrier such that in response to transverse movement of said movable carrier said internal deckle member is adjusted transversely.

8. The extrusion die of claim 5 wherein said deckle system includes an internal deckle member that is adjustable transversely and a movable carrier, said internal deckle member being mounted to said movable carrier such that in response to transverse movement of said movable carrier said internal deckle member is adjusted transversely, said retractable base being mounted to said movable carrier.

9. The extrusion die of claim 1 wherein said deckle system includes an internal deckle rod, a deckle quill, and a secondary deckle flag, said internal deckle rod configured to move transversely out of said transition zone in response to movement of said retractable base, said deckle quill disposed in said manifold, and said secondary deckle flag disposed in said preland channel.

10. A deckle system having an external deckle and an end plate, said end plate having a die side and a distal side, said die side configured to be mounted on an end of an extrusion die, said end plate having a slot opening passing transversely through said end plate, said external deckle having a retractable base, said retractable base mounted so as to be moveable transversely away from said end plate to expose a cleaning access defined by said deckle system, without having to disassemble said deckle system, said cleaning access configured to receive a scraper, said cleaning access located transversely away from, and outwardly of, said end plate, such that said cleaning access is on said distal side of said end plate and is external to the extrusion die when said end plate is mounted to the extrusion die, and said slot opening passing transversely through said end plate opens to said cleaning access, such that an access path for the scraper extends first through said cleaning access and then transversely along said slot opening.

11. The deckle system of claim 10 wherein said retractable base has a first end region, and wherein, when said cleaning access is exposed by moving said retractable base transversely away from said end plate, said cleaning access is located between said end plate and said first end region of said retractable base.

12. The deckle system of claim 11 wherein said retractable base has two projection bars that project from said first end region of said retractable base, said two projection bars are at least generally parallel to each other, and wherein, when said cleaning access is exposed by moving said retractable base transversely away from said end plate, said two projection bars bound said cleaning access.

13. The deckle system of claim 12 wherein said end plate has two openings, each of said two projection bars of said retractable base are received by a respective one of said openings.

14. The deckle system of claim 10 further comprising an internal deckle member that is adjustable transversely, and a movable carrier, said internal deckle member being mounted to said movable carrier such that in response to transverse movement of said movable carrier said internal deckle member is adjusted transversely, said retractable base being mounted to said movable carrier.

15. The deckle system of claim 14 wherein said internal deckle member comprises a quill, said deckle system further comprising a secondary flag and an internal deckle rod, said quill being mounted to said movable carrier, said secondary flag being mounted to said movable carrier, and said internal deckle rod being mounted to said retractable base.

16. The extrusion die of claim 1 wherein said deckle system includes a movable carrier comprising a body, a plurality of transverse openings extend through said body, and a plurality of beams mounted respectively in said transverse openings, such that said carrier is movable transversely along said beams.

17. The extrusion die of claim 16 wherein said deckle system includes a drive system configured to move said carrier transversely.

18. The extrusion die of claim 3 wherein said access path extends in an upstream direction through said cleaning access, then transversely along said slot opening, and into said transition zone and said final land channel.

19. The extrusion die of claim 7 wherein said retractable base has a first configuration in which said retractable base is locked to said movable carrier and a second configuration in which said retractable base is free to move transversely relative to said movable carrier.

20. The deckle system of claim 10 further comprising a movable carrier having a body, a plurality of transverse openings extend through said body, and a plurality of beams mounted respectively in said transverse openings, such that said carrier is movable transversely along said beams.

21. The deckle system of claim 20 further comprising a drive system configured to move said deckle carrier transversely.

22. The deckle system of claim 10 wherein when said retractable base is moved transversely away from said end plate to expose said cleaning access, said slot opening passing transversely through said end plate opens to said cleaning access, such that an access path for the scraper extends in an upstream direction through said cleaning access, then transversely along said slot opening in said end plate.

23. The deckle system of claim 14 wherein said retractable base has a first configuration in which said retractable base is locked to said movable carrier and a second configuration in which said retractable base is free to move transversely relative to said movable carrier.

\* \* \* \* \*